(12) United States Patent
Kwon et al.

(10) Patent No.: US 8,791,896 B2
(45) Date of Patent: Jul. 29, 2014

(54) ELECTROPHORETIC DISPLAY APPARATUS

(75) Inventors: Seonggyu Kwon, Suwon-si (KR);
Gilhwan Yeo, Hwaseong-si (KR);
Myung-Eun Kim, Seongnam-si (KR);
Byungseok Choi, Seoul (KR);
Jung-Moo Hong, Seoul (KR); SonUk Lee, Seongnam-si (KR); Sang-Hee Jang, Bucheon-si (KR)

(73) Assignee: Samsung Display Co., Ltd. (KR)

( * ) Notice: Subject to any disclaimer, the term of this patent is extended or adjusted under 35 U.S.C. 154(b) by 323 days.

(21) Appl. No.: 13/324,390

(22) Filed: Dec. 13, 2011

(65) Prior Publication Data
US 2012/0154898 A1 Jun. 21, 2012

(30) Foreign Application Priority Data

Dec. 17, 2010 (KR) .................. 10-2010-0130060

(51) Int. Cl.
*G09G 3/34* (2006.01)
*G02B 26/00* (2006.01)

(52) U.S. Cl.
USPC .............................. 345/107; 345/55; 359/296

(58) Field of Classification Search
USPC .................... 359/296; 345/55, 107
See application file for complete search history.

(56) References Cited

U.S. PATENT DOCUMENTS

| 6,639,580 B1 * | 10/2003 | Kishi et al. ............. 345/107 |
| 6,738,039 B2 * | 5/2004 | Goden ..................... 345/107 |
| 6,762,744 B2 * | 7/2004 | Katase ..................... 345/107 |
| 6,822,783 B2 * | 11/2004 | Matsuda et al. ............. 359/296 |
| 6,873,451 B2 * | 3/2005 | Ukigaya ..................... 359/296 |
| 6,897,996 B2 * | 5/2005 | Ikeda et al. ................. 359/296 |
| 7,250,933 B2 | 7/2007 | De Boer et al. |
| 7,277,219 B2 | 10/2007 | Ikeda |
| 7,492,505 B2 | 2/2009 | Liang et al. |
| 7,605,899 B2 * | 10/2009 | Shikina et al. ............... 349/149 |
| 2001/0030639 A1 | 10/2001 | Goden |
| 2003/0016429 A1 | 1/2003 | Ikeda et al. |
| 2004/0032389 A1 * | 2/2004 | Liang et al. ............. 345/107 |
| 2004/0239613 A1 | 12/2004 | Kishi |
| 2005/0012979 A1 * | 1/2005 | Minami ..................... 359/296 |
| 2005/0179984 A1 * | 8/2005 | Liang et al. ................. 359/296 |
| 2006/0038772 A1 | 2/2006 | Amundson et al. |
| 2010/0328756 A1 * | 12/2010 | Miyashita et al. ............ 359/296 |

FOREIGN PATENT DOCUMENTS

| EP | 1416315 A3 | 4/2007 |
| JP | 2003-005226 A | 1/2003 |
| JP | 2005-266711 A | 9/2005 |
| JP | 2005-345644 A | 12/2005 |

(Continued)

*Primary Examiner* — Evelyn A. Lester
(74) *Attorney, Agent, or Firm* — Cantor Colburn LLP

(57) ABSTRACT

An electrophoretic display apparatus includes a first substrate including a plurality of pixels, a second substrate facing the first substrate, an electrophoretic material between the first and second substrates, and a first electrode on the first substrate or the second substrate. Each pixel includes a reflection part and a second electrode. The reflection part is on the first substrate and reflects light incident through the second substrate. The second electrode is on the first substrate and adjacent to the reflection part. The second electrode forms an electric field with the first electrode such that the electrophoretic material moves to the first electrode or the second electrode. An upper surface of the second electrode is positioned at a first height from the first substrate, and an upper surface of an uppermost layer of the reflection part is positioned at a second height higher than the first height.

29 Claims, 30 Drawing Sheets

(56) References Cited

FOREIGN PATENT DOCUMENTS

| KR | 10-2004-0108095 A | 12/2004 |
| KR | 1020050086555 A | 8/2005 |
| KR | 10-2008-0034700 A | 4/2008 |
| KR | 1020090003842 A | 1/2009 |
| KR | 10-2009-0073887 A | 7/2009 |

\* cited by examiner

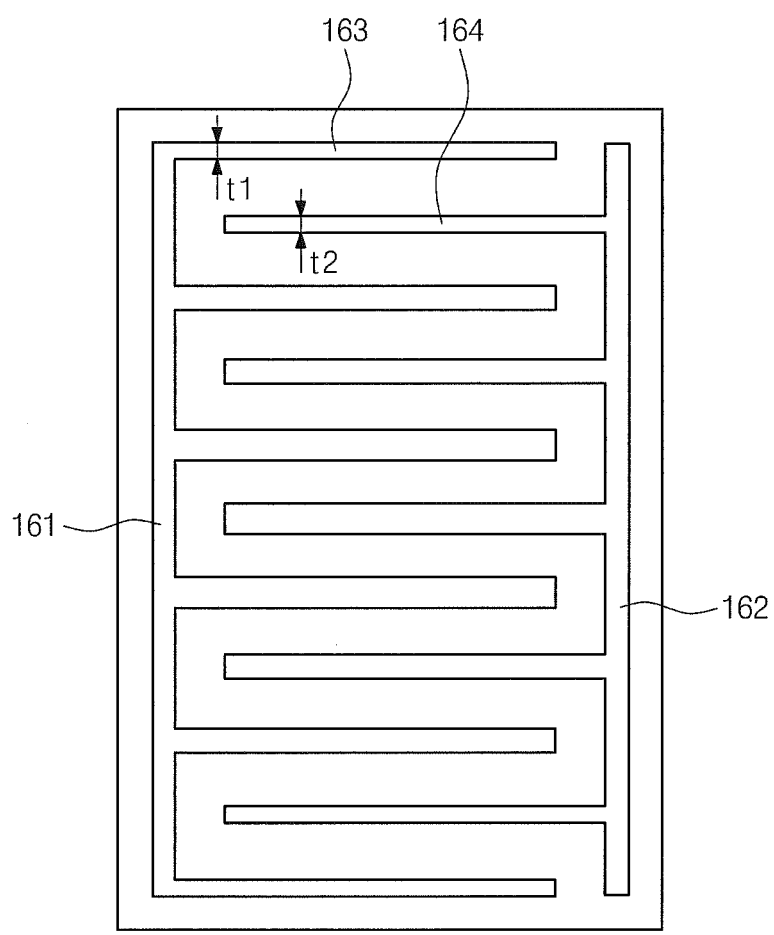

ELECTROPHORETIC DISPLAY APPARATUS

This application claims priority to Korean Patent Application No. 10-2010-0130060 filed on Dec. 17, 2010, and all the benefits accruing therefrom under 35 U.S.C. §119, the contents of which are herein incorporated by reference in its entirety.

BACKGROUND OF THE INVENTION

1. Field of the Invention

The invention relates to an electrophoretic display apparatus. More particularly, the invention relates to an electrophoretic display apparatus capable of improving reflectance thereof.

2. Description of the Related Art

A liquid crystal display displays an image using optical properties of liquid crystal and has characteristics, such as slimness, lightweight, etc., compared to a cathode ray tube. However, since the liquid crystal display requires a backlight assembly to provide light to the liquid crystal, the slimness and weight of the liquid crystal display are limited largely by the backlight assembly.

An electrophoretic display apparatus displays an image using an electrophoretic phenomenon in which electrified pigment particles move due to an electric field generated between two substrates. Since the electrophoretic display apparatus is a reflective-type display apparatus that reflects or absorbs light from an exterior source using the pigment particles, no light source is required. Accordingly, the electrophoretic display apparatus has attractive characteristics such as slimness and lightweight.

BRIEF SUMMARY OF THE INVENTION

Exemplary embodiments of the invention provide an electrophoretic display apparatus capable of improving reflectance thereof According to an exemplary embodiment, an electrophoretic display apparatus includes a first substrate including a plurality of pixels, a second substrate facing the first substrate, an electrophoretic material between the first substrate and the second substrate, and a first electrode on the first substrate or the second substrate.

Each pixel includes a reflection part on the first substrate and reflecting a light incident through the second substrate, and a second electrode on the first substrate and adjacent to the reflection part. The second electrode forms an electric field with the first electrode to move the electrophoretic material to the first electrode or the second electrode. An upper surface of the second electrode is positioned at a first height from the first substrate, and an upper surface of an uppermost layer of the reflection part is positioned at a second height higher than the first height.

In an exemplary embodiment, the reflection part may include at least two layers having different refractive indexes from each other, and may be stacked (e.g., aligned overlapping) one on another. Where the reflection part includes the at least two layers having the different refractive indexes and being stacked one on another, a reflectance of the light incident from exterior may be improved.

In an exemplary embodiment, the electrophoretic display apparatus further includes a barrier wall. The electrophoretic particles are accommodated in a receiving space defined between the reflection part and the barrier wall during a white driving mode, thereby improving an aperture ratio of the electrophoretic display apparatus.

BRIEF DESCRIPTION OF THE DRAWINGS

The above and other advantages of the invention will become readily apparent by reference to the following detailed description when considered in conjunction with the accompanying drawings, in which:

FIGS. 8A to 8D are plan views showing exemplary embodiments of a first electrode according to the invention;

DETAILED DESCRIPTION OF THE INVENTION

Figure 1:
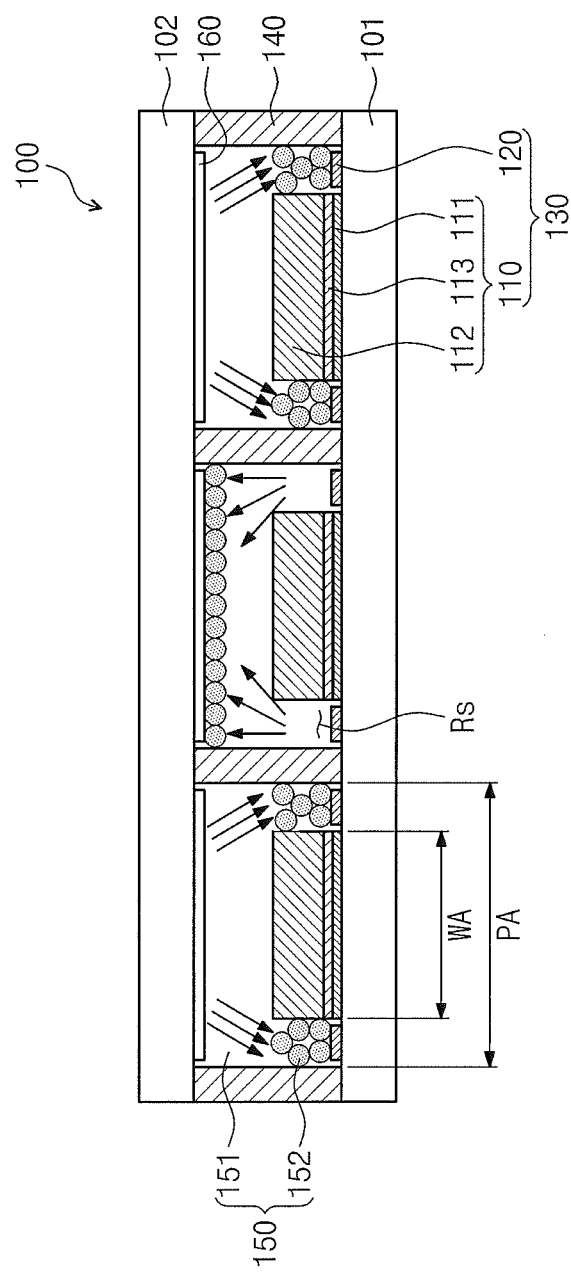
FIG. 1 is a cross-sectional view showing an exemplary embodiment of an electrophoretic display apparatus according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. The term "connected" may include physically and/or electrically connected. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" other elements or features would then be oriented "above" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

FIG. 1 is a cross-sectional view showing an exemplary embodiment of an electrophoretic display apparatus according to the invention.

Referring to FIG. 1, an electrophoretic display apparatus 100 includes a first substrate 101 including a plurality of pixels 130, a second substrate 102 facing the first substrate 101, an electrophoretic material 150 interposed between the first substrate 101 and the second substrate 102, and a first electrode 160 on the second substrate 102. The electrophoretic material 150 includes a dielectric solvent 151 and a plurality of electrophoretic particles 152 dispersed in the dielectric solvent 151. The electrophoretic particles 152 may be particles colored by a white, black, red, green, or blue color. The electrophoretic particles 152 move along a direction of an electric field generated between the first substrate 101 and the second substrate 102.

Each of the pixels 130 includes a reflection part 110 and a second electrode 120. In detail, the reflection part 110 is on the first substrate 101 to define a white area WA and to reflect light incident through the second substrate 102. In addition, the reflection part 110 may include at least a two-layered structure. In the illustrated exemplary embodiment, the reflection part 110 has a triple-layer structure in which three layers are stacked one on another, to be overlapped and aligned with each other.

The second electrode 120 is on the first substrate 101 along an end portion of the reflection part 110. That is, the second electrode 120 may be outside of an outer edge or boundary of the reflection part 110. The second electrode 120 forms the electric field together with the first electrode 160, therebetween. The electrophoretic particles 152 move to the second electrode 120 along the direction of the electric field to be positioned at the end portion of the reflection part 110, and to be moved to the first electrode 160, as illustrated by the arrows in FIG. 1. Although not shown in FIG. 1, the second electrode 120 is electrically connected to a switching device of each pixel and receives a voltage by the turning on and off of the switching device.

The electrophoretic display apparatus 100 further includes a barrier wall 140 between the first substrate 101 and the second substrate 102 to divide the electrophoretic display apparatus 100 into pixel areas PA respectively including the pixels 130.

The second electrode 120 is between the barrier wall 140 and the reflection part 110, and the electrophoretic particles 152 moved to the second electrode 120 are accommodated in a receiving space Rs between the barrier wall 140 and the reflection part 110. In an exemplary embodiment, the electrophoretic particles 152 may include black particles such as a carbon black particle.

When a first voltage is applied to the first electrode 160, and a second voltage higher than the first voltage is applied to the second electrode 120 while the electrophoretic particles 152 have a positive (+) polarity, the electrophoretic particles 152 move to the first electrode 160. Hereinafter, this will be referred to as a "black driving mode." In addition, when the first voltage is applied to the first electrode 160 and a third voltage lower than the first voltage is applied to the second electrode 120 while the electrophoretic particles 152 have the positive (+) polarity, the electrophoretic particles 152 move to the second electrode 120 and are accommodated in the receiving space Rs between the barrier wall 140 and the reflection part 110. Hereinafter, this will be referred to as a "white driving mode"

When the electrophoretic particles 152 have a negative (−) polarity, the electrophoretic particles 152 move to opposite directions to the above-mentioned directions when the electrophoretic particles 152 have the positive (+) polarity.

Figure 2A:
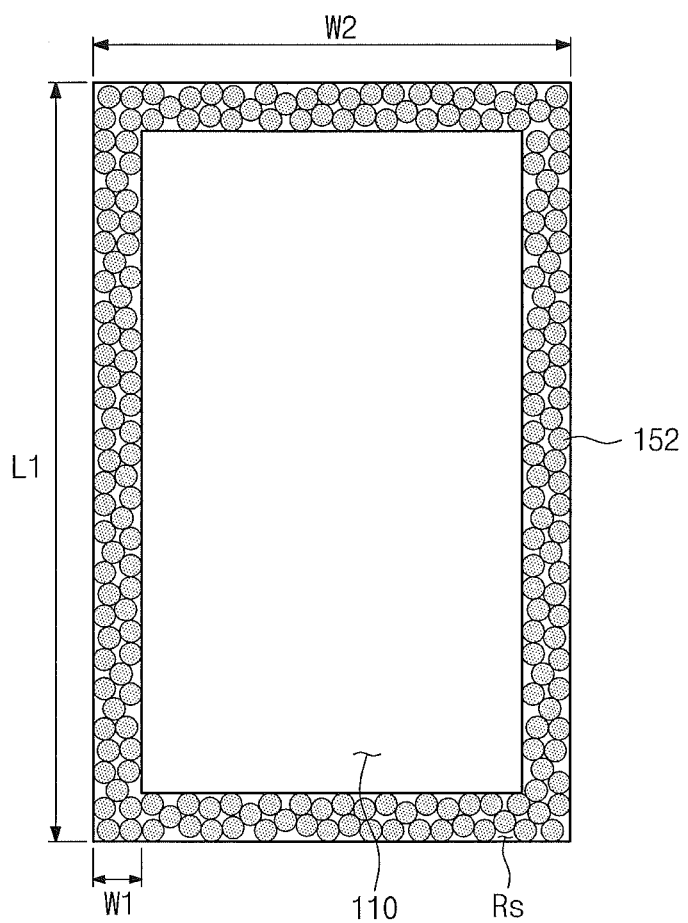
FIG. 2A is a plan view showing a pixel that displays a white image.
Figure 2B:
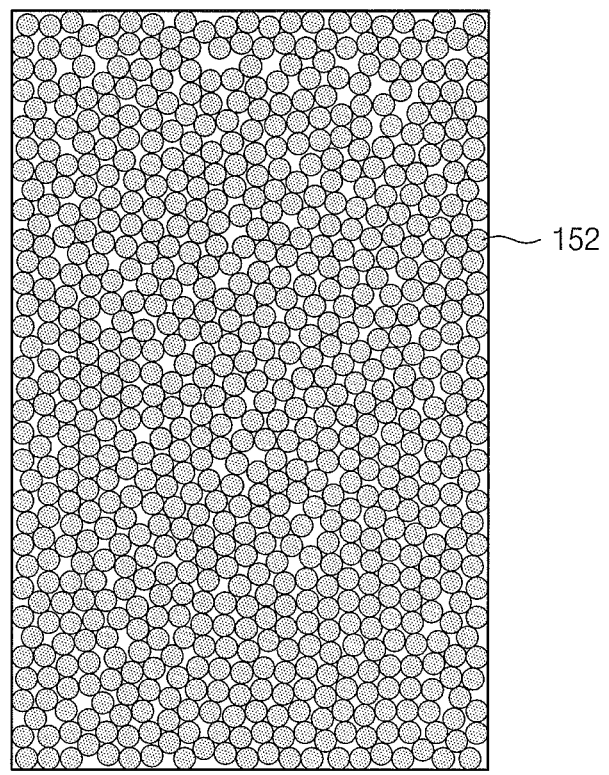
FIG. 2B is a plan view showing a pixel that displays a black image.

FIG. 2A is a plan view showing a pixel that displays a white image, and FIG. 2B is a plan view showing a pixel that displays a black image.

Referring to FIG. 2A, since the electrophoretic particles 152 move to the second electrode 120 during the white driving mode, the electrophoretic particles 152 may be accommodated in the receiving space Rs between the barrier wall 140 and the reflection part 110. That is, the reflection part 110 may reflect the light incident through the second substrate 102 since the electrophoretic particles 152 are outside of an outer edge or boundary of the reflection part 110 during the white driving mode, and do not overlap the reflection part 110. As a result, the pixels 130 may display an image having a white gray scale.

Referring to FIG. 2B, during the black driving mode, the electrophoretic particles 152 move to the first electrode 160 to essentially entirely cover (e.g., overlap) the pixel area PA in the plan view. Thus, the light passing through the second substrate 102 is absorbed by the electrophoretic particles 152 having the black color, so that the pixels 130 may display the image having a black gray scale.

In order to accommodate the electrophoretic particles 152 in the receiving space Rs during the white driving mode, a width W1 of the receiving space Rs must be larger than a diameter of each electrophoretic particle 152. Particularly, the width W1 of the receiving space Rs may be determined depending upon the diameter of the electrophoretic particles 152, a total length L1 of the pixel area PA, and a total width W2 of the pixel area PA.

In one exemplary embodiment, for example, when the length L1 of the pixel area PA in a first direction is about 300 micrometers (μm) and the width W2 of the pixel area PA in a second direction is about 100 micrometers, the width W1 and depth of the receiving space Rs may be determined according to the diameter of the electrophoretic particles 152 as the following Table 1. The depth is taken in a third direction orthogonal to both the first and second directions.

TABLE 1

| Diameter of electrophoretic particle (μm) | Width of receiving space (μm) | Depth of receiving space (μm) |
| --- | --- | --- |
| 1 | 10 | 2.8 |
| 2 | 10 | 5.6 |

TABLE 1-continued

| Diameter of electrophoretic particle (μm) | Width of receiving space (μm) | Depth of receiving space (μm) |
| --- | --- | --- |
| 3 | 10 | 8.4 |
| 3 | 15 | 4.7 |
| 3 | 20 | 2.9 |

According to Table 1, when the width W1 of the receiving space Rs is assumed to be constant, the depth of the receiving space W1 increases as the diameter of the electrophoretic particles 152 increases. In addition, when the diameter of the electrophoretic particles 152 is assumed to be constant, the depth of the receiving space Rs may be reduced as the width W1 of the receiving space Rs increases. In the illustrated exemplary embodiment, the depth of the receiving space Rs may be varied by controlling a thickness of the reflection part 110 taken in the third direction.

When the length L1 of the pixel area PA is about 450 micrometers and the width W2 of the pixel area PA is about 150 micrometers, the width W1 and the depth of the receiving space Rs may be determined according to the diameter of the electrophoretic particles 152 as the following Table 2.

TABLE 2

| Diameter of electrophoretic particle (μm) | Width of receiving space (μm) | Depth of receiving space (μm) |
| --- | --- | --- |
| 1 | 15 | 2.8 |
| 2 | 15 | 5.6 |
| 3 | 15 | 8.4 |
| 3 | 20 | 5.6 |
| 3 | 30 | 2.9 |

According to Table 2, when a size of the pixel area PA increases, the width W1 of the receiving space Rs may be increased.

Under the condition that the size of the pixel area PA is determined to be 450×150, when the width W1 of the receiving space Rs increases, the size of the reflection part 110 in the pixel area PA is reduced by the increase of the width W1 of the receiving space Rs. The size of the reflection part 110 serves as a factor in determining an aperture ratio in the white driving mode. Accordingly, in the illustrated exemplary embodiment, a scheme of increasing the depth of the receiving space Rs is suggested other than the scheme of increasing the width W1 of the receiving space Rs.

Figure 3:
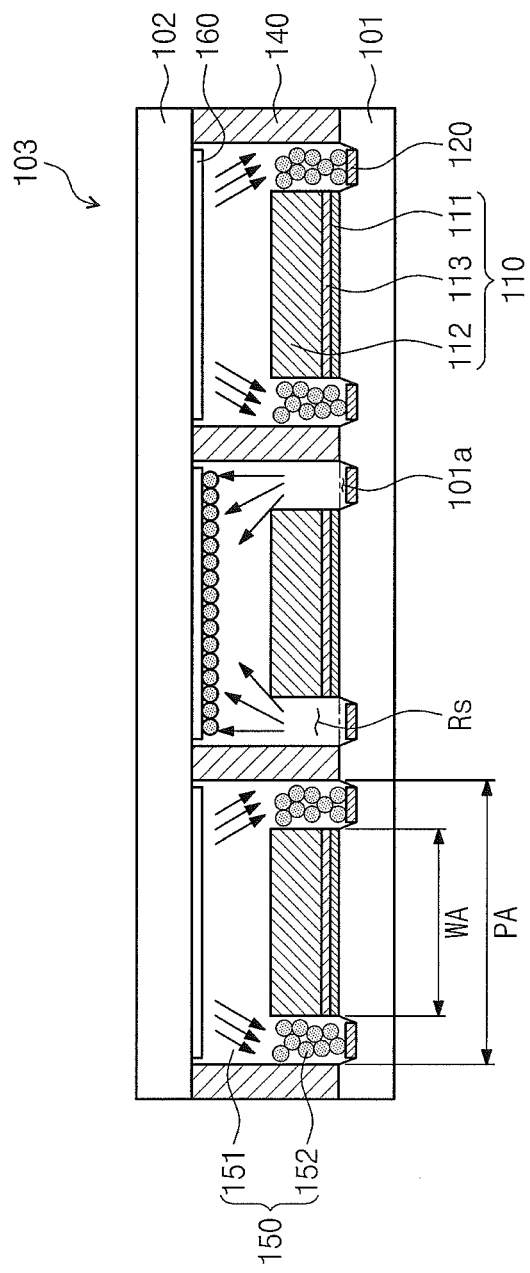
FIG. 3 is a cross-sectional view showing another exemplary embodiment of an electrophoretic display apparatus according to the invention.

FIG. 3 is a cross-sectional view showing another exemplary embodiment of an electrophoretic display apparatus according to the invention.

Referring to FIG. 3, the first substrate 101 includes a trench 101a recessed from an upper surface thereof by a predetermined depth. The trench 101a may be in an area corresponding to the receiving space Rs between the barrier wall 140 and the reflection part 110. Thus, the depth of the receiving space Rs between the barrier wall 140 and the reflection part 110 increases by the depth of the trench 101a. As described above, when the depth of the receiving space Rs increases by the trench 101a, the width of the receiving space Rs may be reduced, thereby increasing the size of the reflection part 110 in the pixel area PA. As a result, the reflectance of the reflection part 110 of the electrophoretic display apparatus 100 may be improved.

The second electrode 120 may be completely in the trench 101a.

FIGS. 1 to 3 show the second electrode 120 spaced apart from the reflection part 110 by a predetermined distance, but the second electrode 120 may be partially overlapped with the reflection part 110.

Figure 4:
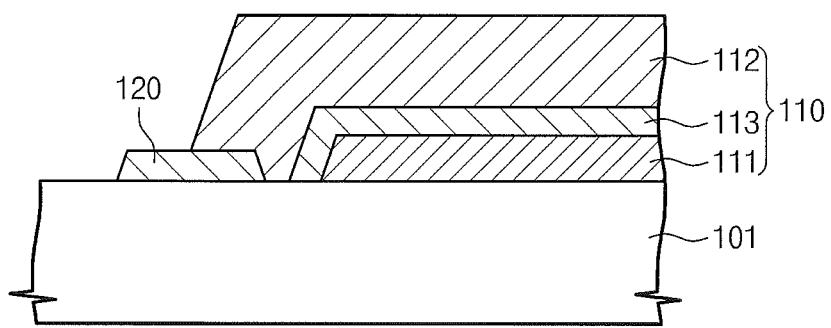
FIG. 4 is a cross-sectional view showing an exemplary embodiment of a relationship between a second electrode and a reflection part.

FIG. 4 is a cross-sectional view showing an exemplary embodiment of a relation between a second electrode and a reflection part.

Referring to FIG. 4, the reflection part 110 includes a reflection layer 111 directly on the first substrate 101 to substantially specularly reflect the light incident through the second substrate 102, a color-expression layer 112 to scatter or transmit the reflected light, and an intermediate layer 113 between the color-expression layer 112 and the reflection layer 111 and having a lower refractive index than that of the color-expression layer 112.

The second electrode 120 may be partially overlapped with the reflection part 110. In detail, the second electrode 120 may be overlapped with a portion of the color-expression layer 112 that is an uppermost layer of the reflection part 110.

As described above, when the color-expression layer 112 is overlapped with the second electrode 120, the entire size of the color-expression layer 112 in the pixel area PA may be increased more than when the color-expression layer 112 is spaced apart from the second electrode 120.

FIGS. 5A to 5D are cross-sectional views showing exemplary embodiments of a reflection part according to the invention.

Figure 5A:
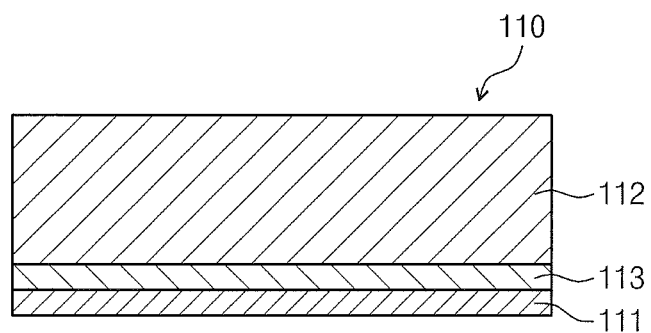
FIGS. 5A to 5D are cross-sectional views showing exemplary embodiments of a reflection part according to the invention.

Referring to FIG. 5A, the reflection part 110 includes the reflection layer 111 to substantially specularly reflect the light, the color-expression layer 112 to scatter or transmit the reflected light, and the intermediate layer 113 between the reflection layer 111 and the color-expression layer 112 and having a lower refractive index than that of the color-expression layer 112.

In one exemplary embodiment, the reflection layer 111 may include a material having high reflectance such as aluminum (Al) and has a thickness of about 0.1 micrometer.

The color-expression layer 112 may include a white photoresist. In the illustrated exemplary embodiment, the white photoresist may include titanium oxide ($TiO_2$) having a refractive index of about 2.89. In addition, the color-expression layer 112 may further include a plurality of scattering particles (not shown) scattered in the white photoresist. In an exemplary embodiment, the color-expression layer 112 may be patterned by a photolithography process to have a rectangular-like shape, and to have a thickness of about 3 micrometers.

The intermediate layer 113 includes a material having a lower refractive index than that of the color-expression layer 112. In the illustrated exemplary embodiment, the intermediate layer 113 may include at least one layer of a transparent inorganic layer, a transparent organic layer, and a transparent conductive layer. The transparent inorganic layer may include a silicon nitride layer (SiNx) or a silicon oxide layer (SiOx). The transparent organic layer may include an acrylic-based resin. The transparent conductive layer may include indium tin oxide ("ITO") or indium zinc oxide ("IZO").

The silicon nitride layer (SiNx) has a refractive index of about 2.0 to about 2.1, and the silicon oxide layer (SiOx) has a refractive index of about 1.46. In addition, the indium tin oxide and the indium zinc oxide have a refractive index of about 2.1 to about 2.2. The acrylic-based resin has a refractive index of about 1.54.

In addition, each of the transparent inorganic layer and the transparent conductive layer has a thickness of about 0.2 micrometer and the transparent organic layer has a thickness of about 2 micrometers.

When the intermediate layer 113 includes the silicon nitride layer (SiNx) having the thickness of about 0.2 micrometer, the reflection part 110 has the reflectance of about 66%. When the intermediate layer 113 includes indium zinc oxide having the thickness of about 0.2 micrometer, the reflection part 110 has the reflectance of about 71%. When the intermediate layer 113 includes the transparent organic layer having the thickness of about 2 micrometers, the reflection part 110 has the reflectance of about 74%.

Figure 6:
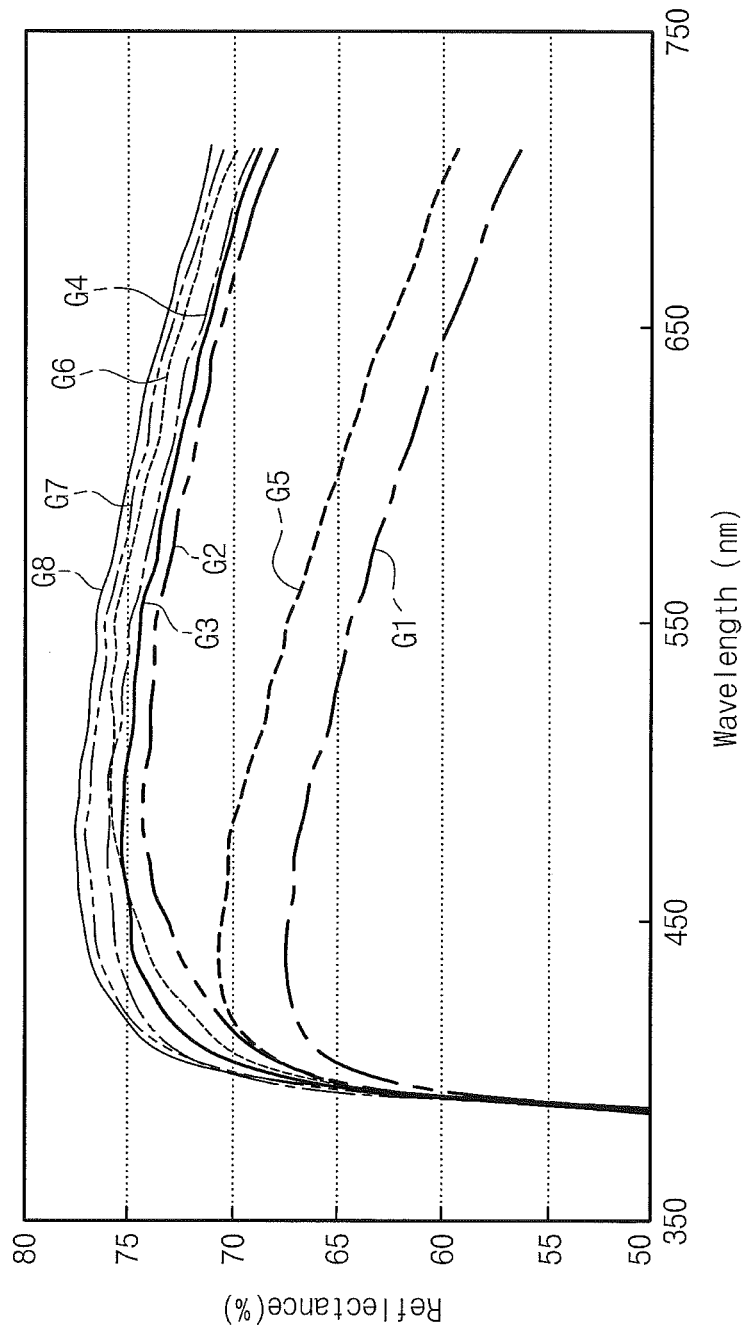
FIG. 6 is a graph showing a reflectance of a reflection part as a function of a thickness of an organic layer.

FIG. 6 is a graph showing a reflectance of a reflection part in percent (%) as a function of a thickness of an organic layer in nanometers (nm).

In FIG. 6, a first graph G1 represents the reflectance of the reflection part 110 that includes the color-expression layer 112 of about 3 micrometers in thickness and the reflection layer 111 of about 3 micrometers in thickness without employing the intermediate layer 113. A second graph G2 represents the reflectance of the reflection part 110 that includes the color-expression layer 112 of about 3 micrometers in thickness, the transparent organic layer 113 of about 1 micrometer in thickness, and the reflection layer 111 of about 1 micrometer in thickness. A third graph G3 represents the reflectance of the reflection part 110 that includes the color-expression layer 112 of about 3 micrometers in thickness, the transparent organic layer 113 of about 2 micrometers in thickness, and the reflection layer 111 of about 2 micrometers in thickness. A fourth graph G4 represents the reflectance of the reflection part 110 that includes the color-expression layer 112 of about 3 micrometers in thickness, the transparent organic layer 113 of about 3 micrometers in thickness, and the reflection layer 111 of about 3 micrometers in thickness.

In addition, a fifth graph G5 represents the reflectance of the reflection part 110 that includes the color-expression layer 112 of about 4 micrometers in thickness and the reflection layer 111 of about 4 micrometers without employing the intermediate layer 113. A sixth graph G6 represents the reflectance of the reflection part 110 that includes the color-expression layer 112 of about 4 micrometers in thickness, the transparent organic layer 113 of about 1 micrometer in thickness, and the reflection layer 111 of about 1 micrometer in thickness. A seventh graph G7 represents the reflectance of the reflection part 110 that includes the color-expression layer 112 of about 4 micrometers in thickness, the transparent organic layer 113 of about 2 micrometers in thickness, and the reflection layer 111 of about 2 micrometers in thickness. An eighth graph G8 represents the reflectance of the reflection part 110 that includes the color-expression layer 112 of about 4 micrometers in thickness, the transparent organic layer 113 of about 3 micrometers in thickness, and the reflection layer 111 of about 3 micrometers in thickness.

Referring to FIG. 6, as the thickness of the color-expression layer 112 increases from 3 micrometers to 4 micrometers, the reflectance of the reflection part 110 increases, and the reflectance of the reflection part 110 increases as the thickness of the transparent organic layer 113 increases.

In addition, the reflectance when the reflection part 110 further includes the transparent organic layer 113 is higher than the reflectance when the reflection part 110 includes only the color-expression layer 112 and the reflection layer 111 without the transparent organic layer 113.

Accordingly, when the intermediate layer 113 is between the reflection layer 111 and the color-expression layer 112 while increasing the thickness of the color-expression layer 112, the reflectance of the reflection part 110 may be improved. That is, the reflectance of the reflection part 110 may be improved by adjusting the thickness of the color-expression layer 112 and/or disposing the intermediate layer 113 between the reflection layer 111 and the color-expression layer 112, without increasing the size of the reflection part 110 in the pixel area PA.

Figure 5B:
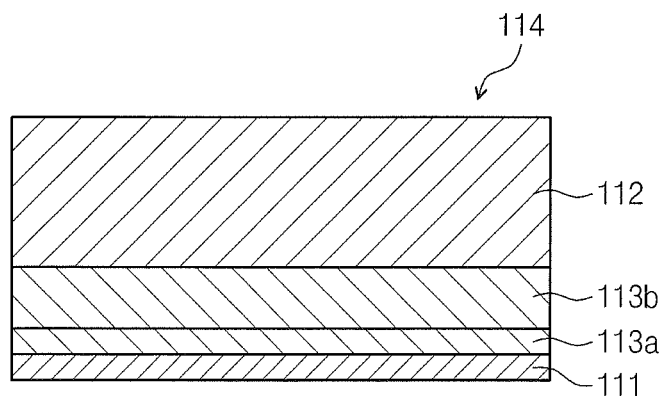

Referring to FIG. 5B, a reflection part 114 includes the reflection layer 111, the color-expression layer 112, and first and second intermediate layers 113a and 113b between the reflection layer 111 and the color-expression layer 112.

In the illustrated exemplary embodiment, the first intermediate layer 113a is directly on the reflection layer 111 and may include a silicon nitride layer (SiNx). The second intermediate layer 113b is directly on the first intermediate layer 113a and may include the transparent organic layer. The first intermediate layer 113a has a thickness of about 0.2 micrometer and the second intermediate layer 113b has a thickness of about 2 micrometers. In this case, the reflection part 114 may have the reflectance of about 70%, According to another exemplary embodiment, the first intermediate layer 113a may include the transparent conductive layer and the second intermediate layer 113b may include the transparent organic layer. The first intermediate layer 113a has a thickness of about 0.2 micrometer and the second intermediate layer 113b has a thickness of about 2 micrometers. In this case, the reflection part 114 may have the reflectance of about 73%.

Figure 5C:
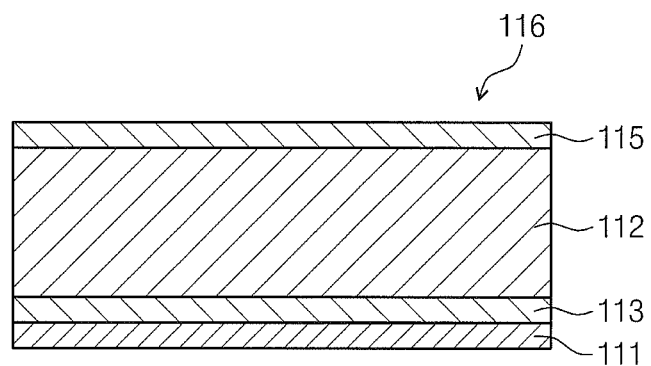

Referring to FIG. 5C, a reflection part 116 includes the reflection layer 111, the color-expression layer 112, the intermediate layer 113 between the reflection layer 111 and the color-expression layer 112, and a dummy layer 115 on the color-expression layer 112.

The dummy layer 115 may include the same material as the intermediate layer 113. In one exemplary embodiment, each of the intermediate layer 113 and the dummy layer 115 may include the transparent organic layer having a thickness of about 1 micrometer. In this case, the reflection part 116 may have the reflectance of about 74%.

Figure 5D:
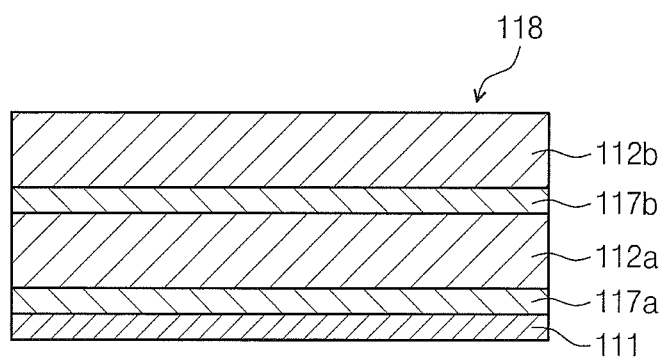

Referring to FIG. 5D, a reflection part 118 includes the reflection layer 111, a first color-expression layer 112a, a first intermediate layer 117a between the reflection layer 111 and the first color-expression layer 112a, a second color-expression layer 112b, and a second intermediate layer 117b between the first color-expression layer 112a and the second color-expression layer 112b.

Each of the first and second color-expression layers 112a and 112b includes the white photoresist and has a thickness of about 1.5 micrometers. That is, each of the first and second color-expression layers 112a and 112b may have the thickness corresponding to nearly half of the thickness of the color-expression layer 112 shown in FIG. 5A. Each of the first and second intermediate layers 117a and 117b includes the transparent organic layer and has the thickness of about 1 micrometer. In this case, the reflection part 118 may have the reflectance of about 74%.

In the above-mentioned exemplary embodiments, the color-expression layer 112 has the white color and the electrophoretic particles 152 have the black color, but the color-expression layer 112 may have one of red, green, or blue color. In this case, the electrophoretic particles 152 may have the white color.

FIGS. 7A to 7E are plan views showing exemplary embodiments of a second electrode according to the invention.

Figure 7A:
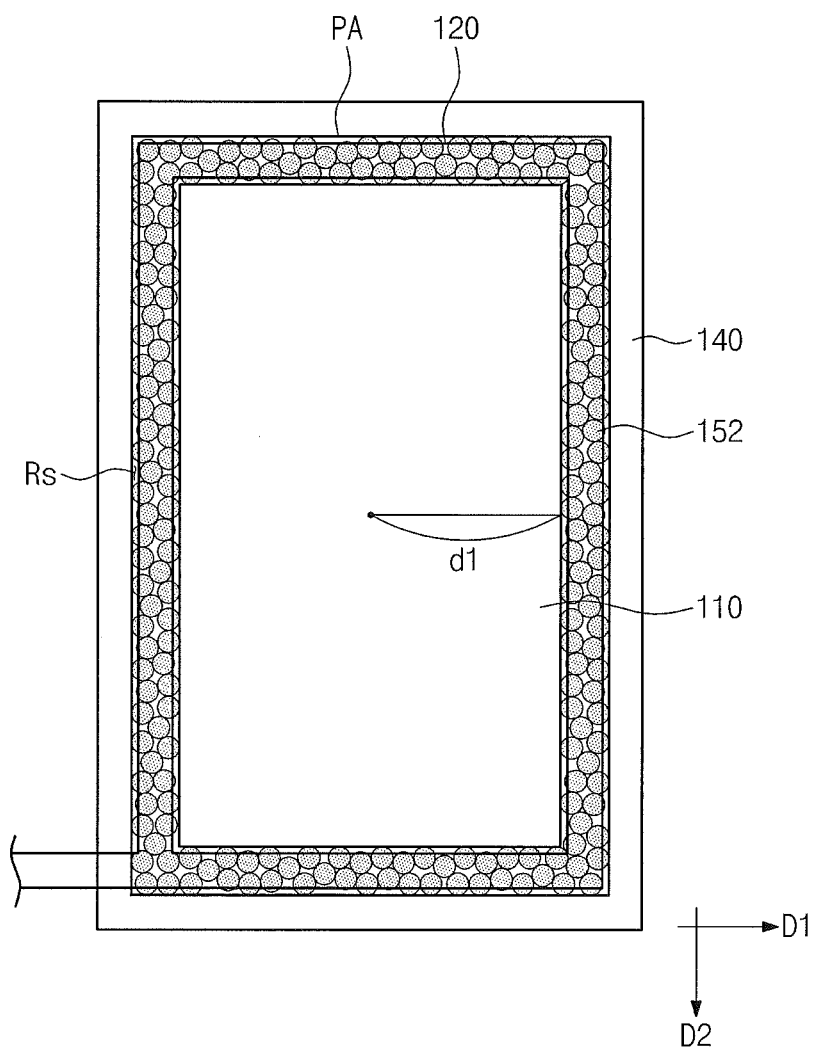
FIGS. 7A to 7E are plan views showing exemplary embodiments of a second electrode according to the invention.

Referring to FIG. 7A, when viewed in a plan view, the reflection part 110 having the rectangular-like shape is in the pixel area PA, and the second electrode 120 is provided along the end portion (e.g., edges) of the reflection part 110. The second electrode 120 has a closed loop shape and is between the barrier wall 140 and the reflection part 110.

The electrophoretic particles 152 move to the first electrode 160 or the second electrode 120 according to the direction of the electric field generated between the first and second electrodes 160 and 120. In other words, when the direction of the electric field is changed while the electrophoretic particles 152 are held in the place on the first electrode 160, the electrophoretic particles 152 move to the second electrode 120 and are accommodated in the receiving space Rs positioned at the end portion of the reflection part 110. On the contrary, when the direction of the electric field is changed while the electrophoretic particles 152 are held in the place on the second electrode 120, the electrophoretic particles 152 move to the first electrode 160.

However, a distance between a center of the first electrode 160 and the receiving space Rs is longer than a distance between an edge of the first electrode 160 and the receiving space Rs. Accordingly, a time interval required to move the electrophoretic particles 152 to the receiving space Rs from the first electrode 160 varies according to the positions of the first electrode 160 at which the electrophoretic particles 152 are held. That is, the electrophoretic particles 152 held in the place on the center of the first electrode 160 needs a time interval to be accommodated in the receiving space Rs, which is longer than a time interval required to accommodate the electrophoretic particles 152 held in the place on the edge of the first electrode 160 in the receiving space Rs.

Thus, hereinafter, exemplary embodiments will be suggested to reduce the moving distances of the electrophoretic particles 152 and the difference between the moving distances of the electrophoretic particles 152.

Figure 7B:
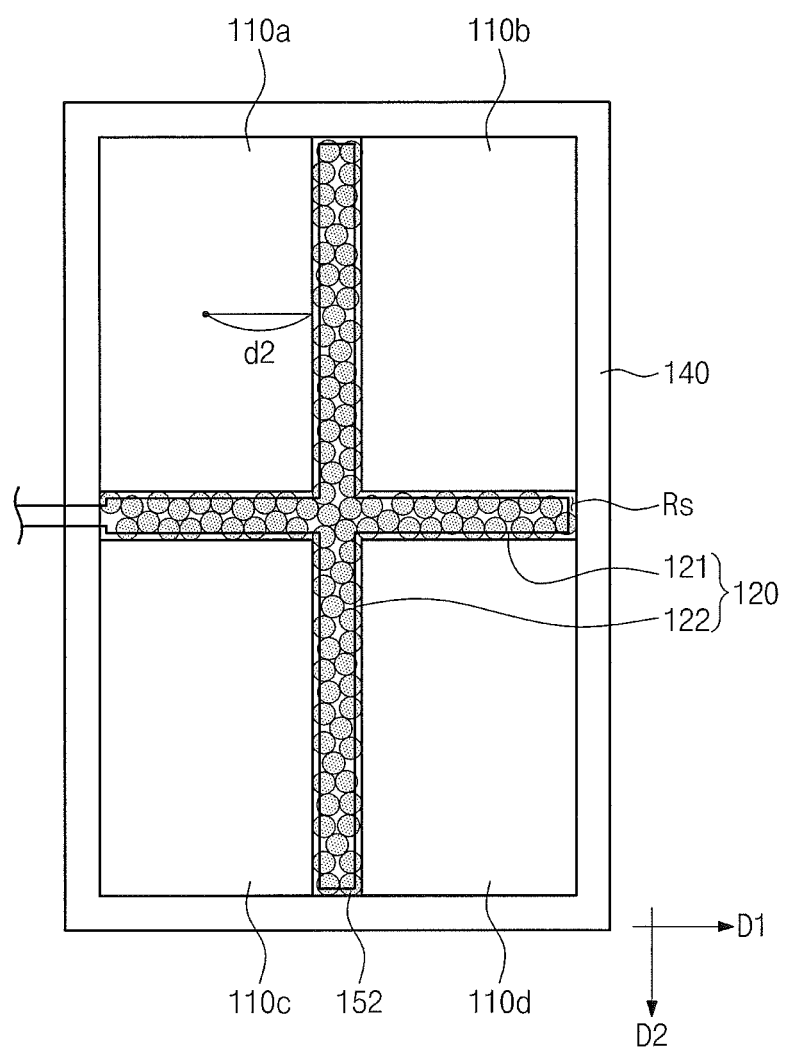

Referring to FIG. 7B, the second electrode 120 includes a first dividing electrode 121 longitudinally extending in a first direction D1 and a second dividing electrode 122 longitudinally extending in a second direction D2 substantially perpendicular to the first direction D1. The first and second dividing electrodes 121 and 122 cross each other at a center of the pixel area PA. The first and second dividing electrodes 121 and 122 may be electrically insulated from each other. However, FIG. 7B shows the first and second dividing electrodes 121 and 122 that are electrically connected to each other.

The reflection part 110 is divided into first, second, third, and fourth sub-reflection parts 110a, 110b, 110c, and 110d, which are spaced apart from each other by a predetermined distance, by the first and second dividing electrodes 121 and 122. The receiving space Rs is defined between respective adjacent first, second, third, and fourth sub-reflection parts 110a, 110b, 110c, and 110d, and portions of the barrier wall 140. Accordingly, a receiving space Rs having a cross shape is provided in the pixel area PA. The electrophoretic particles 152 that move to the second electrode 120 are accommodated in the receiving space Rs.

As described above, when the reflection part 110 is divided into four sub-reflection parts 110a, 110b, 110c, and 110d, a distance d2 in a straight line between a center of each of the sub-reflection parts 110a, 110b, 110c, and 110d and the receiving space Rs corresponds to the half of the distance d1 in a straight line between the center of the reflection part 110 and the receiving space Rs shown in FIG. 7A. Thus, when the reflection part 110 is divided into the four sub-reflection parts 110a, 110b, 110c, and 110d, the moving distance and the moving time of the electrophoretic particles 152 may be reduced.

Figure 7C:
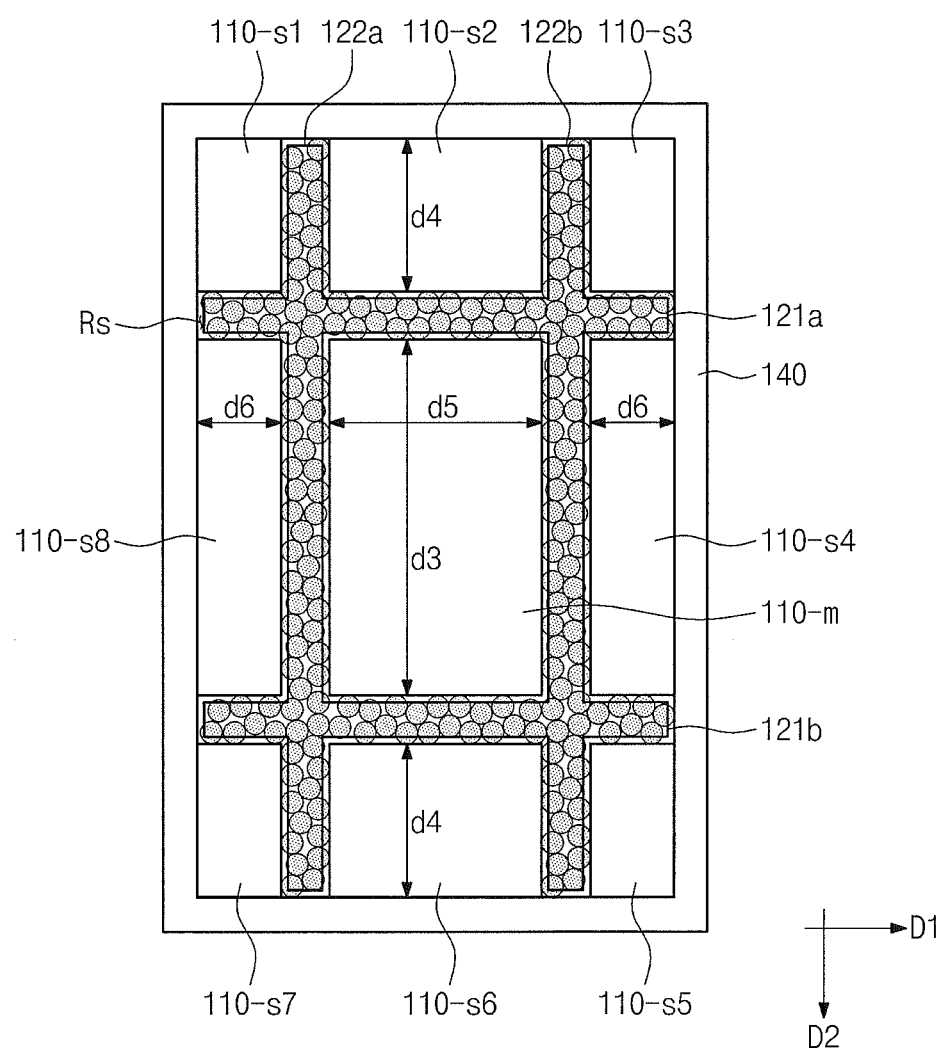

Referring to FIG. 7C, the second electrode 120 includes first and third dividing electrodes 121a and 121b each longitudinally extending in the first direction D1 and spaced apart from each other, and second and fourth dividing electrodes 122a and 122b each longitudinally extending in the second direction D2 and spaced apart from each other. Each of the first and third dividing electrodes 121a and 121b crosses both the second and fourth dividing electrodes 122a and 122b.

The first and third dividing electrodes 121a and 121b are electrically connected to each other, and the second and fourth dividing electrodes 122a and 122b are electrically connected to each other. However, the first dividing electrode 121a may be electrically insulated from the second and fourth dividing electrodes 122a and 122b, and the third dividing electrode 121b may be electrically insulated from the second and fourth dividing electrodes 122a and 122b. However, FIG. 7B shows the first to fourth dividing electrodes 121a to 121d that are electrically connected to each other.

The reflection part 110 includes a main reflection part 110-m in an area defined by the first to fourth dividing electrodes 121a, 122a, 121b, and 122b, and first to eighth sub-reflection parts 110-s1, 110-s2, 110-s3, 110-s4, 110-s5, 110-s6, 110-s7, and 110-s8, the to the main reflection part 110-m. The receiving space Rs is defined between adjacent first to eighth sub-reflection parts 110-s1, 110-s2, 110-s3, 110-s4, 110-s5, 110-s6, 110-s7, and 110-s8, and portions of the barrier wall 140, and between the first to eighth sub-reflection parts 110-s1, 110-s2, 110-s3, 110-s4, 110-s5, 110-s6, 110-s7, and 110-s8, main reflection part 110-m, respectively, and portions of the barrier wall 140.

A distance d3 in a straight line between the first and third dividing electrodes 121a and 121b corresponds to approximately two times a distance d4 between the first dividing electrode 121a and a first end of the barrier wall 140 adjacent to the first dividing electrode 121a, and approximately two times a distance d4 between the third dividing electrode 121b and a second end of the barrier wall 140 adjacent to the third dividing electrode 121b.

In addition, a distance d5 in a straight line between the second and fourth dividing electrodes 122a and 122b corresponds to approximately two times a distance d6 between the second dividing electrode 122a and a third end of the barrier wall 140 adjacent to the second dividing electrode 122a, and approximately two times a distance d6 between the fourth dividing electrode 122b and a fourth end of the barrier wall 140 adjacent to the fourth dividing electrode 122b.

As described above, when the reflection part 110 is divided into the main reflection part 110-m and the first to eighth sub-reflection parts 110-s1, 110-s2, 110-s3, 110-s4, 110-s5, 110-s6, 110-s7, and 110-s8, the moving time and the difference between the moving distances of the electrophoretic particles 152 may be reduced.

Figure 7D:
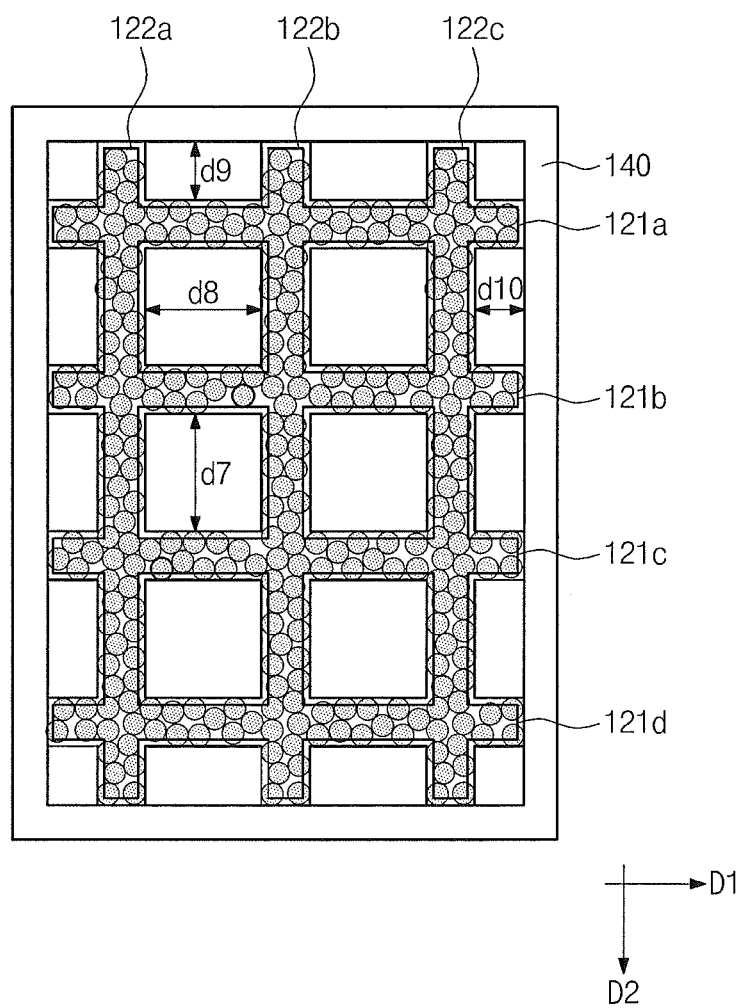

Referring to FIG. 7D, the second electrode 120 includes first, third, fifth, and sixth dividing electrodes 121a, 121b, 121c, and 121d longitudinally extending in the first direction D1 and arranged in the second direction D2, and second, fourth, and seventh dividing electrodes 122a, 122b, and 122c longitudinally extending in the second direction D2 and arranged in the first direction D1.

The first, third, fifth, and sixth dividing electrodes 121a, 121b, 121c, and 121d are arranged in the second direction D2 at a first distance D7, and the second, fourth, and seventh dividing electrodes 122a, 122b, and 122c are arranged in the first direction d1 at a second distance d8.

A first distance d7 corresponds to two times a distance d9 between the first dividing electrode 121a positioned at outermost position of the first, third, fifth, and sixth dividing electrodes 121a, 121b, 121c, and 121d, and a first end of the barrier wall 140 substantially parallel to the first dividing electrode 121a. In addition, the second distance d8 corresponds to two times a distance d10 between the seventh dividing electrode 122c positioned at outermost position of the second, fourth, and seventh dividing electrodes 122a, 122b, and 122c, and a fourth end of the barrier wall 140 substantially parallel to the seventh dividing electrode 122c.

Thus, the moving time and the difference between the moving distances of the electrophoretic particles 152 may be reduced.

Figure 7E:
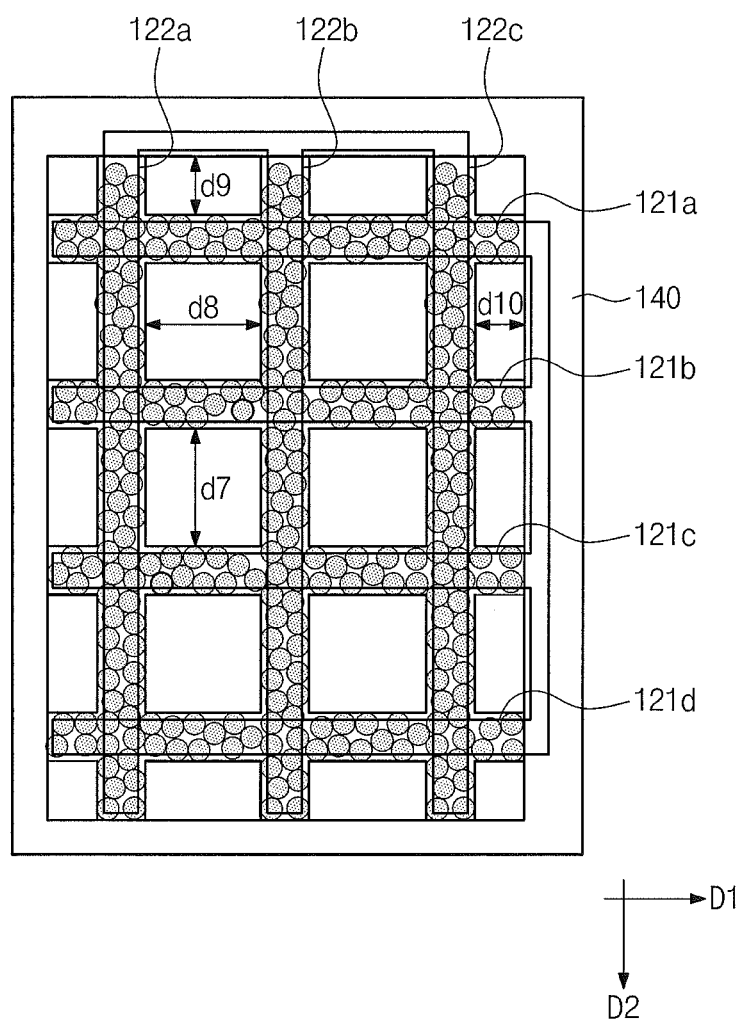

Referring to FIG. 7E, the second electrode 120 includes first, third, fifth, and sixth dividing electrodes 121a, 121b, 121c, and 121d longitudinally extending in the first direction D1 and arranged in the second direction D2, and second, fourth, and seventh dividing electrodes 122a, 122b, and 122c longitudinally extending in the second direction D2 and arranged in the first direction D1.

The first, third, fifth, and sixth dividing electrodes 121a, 121b, 121c, and 121d may be electrically insulated from the second, fourth, and seventh dividing electrodes 122a, 122b, and 122c. In this case, the first, third, fifth, and sixth dividing electrodes 121a, 121b, 121c, and 121d may be electrically connected to each other, and the second, fourth, and seventh dividing electrodes 122a, 122b, and 122c may be electrically connected to each other. As shown in FIG. 7E, a first connecting portion extends from and is continuous with each of the first, third, fifth, and sixth dividing electrodes 121a, 121b, 121c, and 121d. The first connecting portion longitudinally extends in the second direction D2. A second connecting portion extends from and is continuous with each of the second, fourth, and seventh dividing electrodes 122a, 122b, and 122c. The second connecting portion longitudinally extends in the first direction D1.

In addition, in order to electrically insulate the first, third, fifth, and sixth dividing electrodes 121a, 121b, 121c, and 121d from the second, fourth, and seventh dividing electrodes 122a, 122b, and 122c, the first, third, fifth, and sixth dividing electrodes 121a, 121b, 121c, and 121d may be on a layer of the electrophoretic display apparatus different from a layer on which the second, fourth, and seventh dividing electrodes 122a, 122b, and 122c are disposed.

When a first voltage is applied to the first, third, fifth, and sixth dividing electrodes 121a, 121b, 121c, and 121d, a second voltage different from the first voltage may be applied to the second, fourth, and seventh dividing electrodes 122a, 122b, and 122c.

FIGS. 8A to 8D are plan views showing exemplary embodiments of a first electrode according to the invention.

Figure 8A:
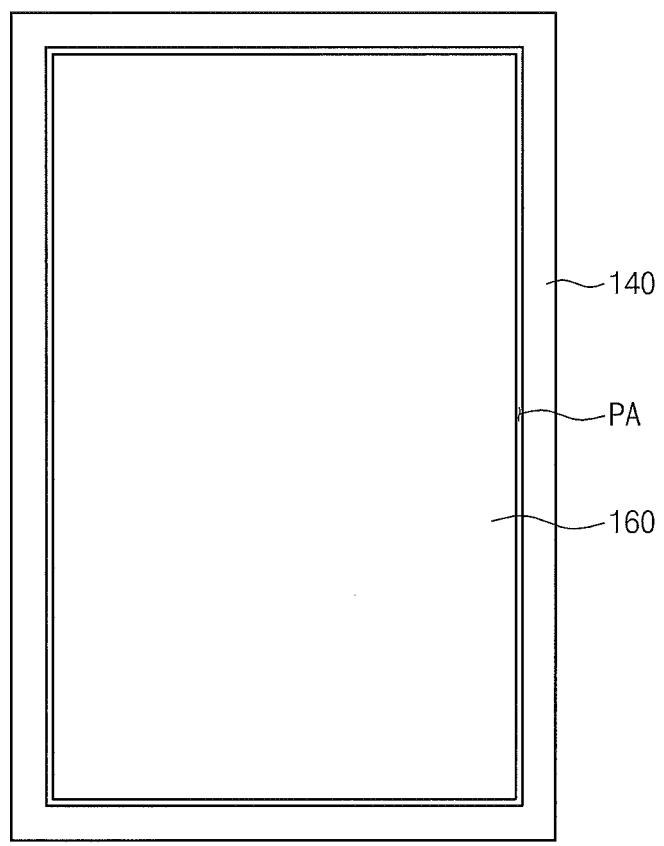

Referring to FIG. 8A, the first electrode 160 having a rectangular-like shape is arranged in the pixel area PA defined by the barrier wall 140 when viewed in a plan view. The first electrode 160 is on the whole surface of the pixel area PA to cover the pixel area PA.

The electrophoretic particles 152 (shown in FIG. 1) accommodated in the receiving space Rs (shown in FIG. 1) between the barrier 140 and the reflection part 110 move to the first electrode 160 when the direction of the electric field is changed. In an exemplary embodiment, the electrophoretic particles 152 are dispersed on an entire surface of the first electrode 160, thereby displaying the black gray scale without the light leakage phenomenon.

Thus, hereinafter, a structure that the electrophoretic particles 152 may be uniformly dispersed in the pixel area PA during the black driving mode will be described in detail.

Figure 8B:
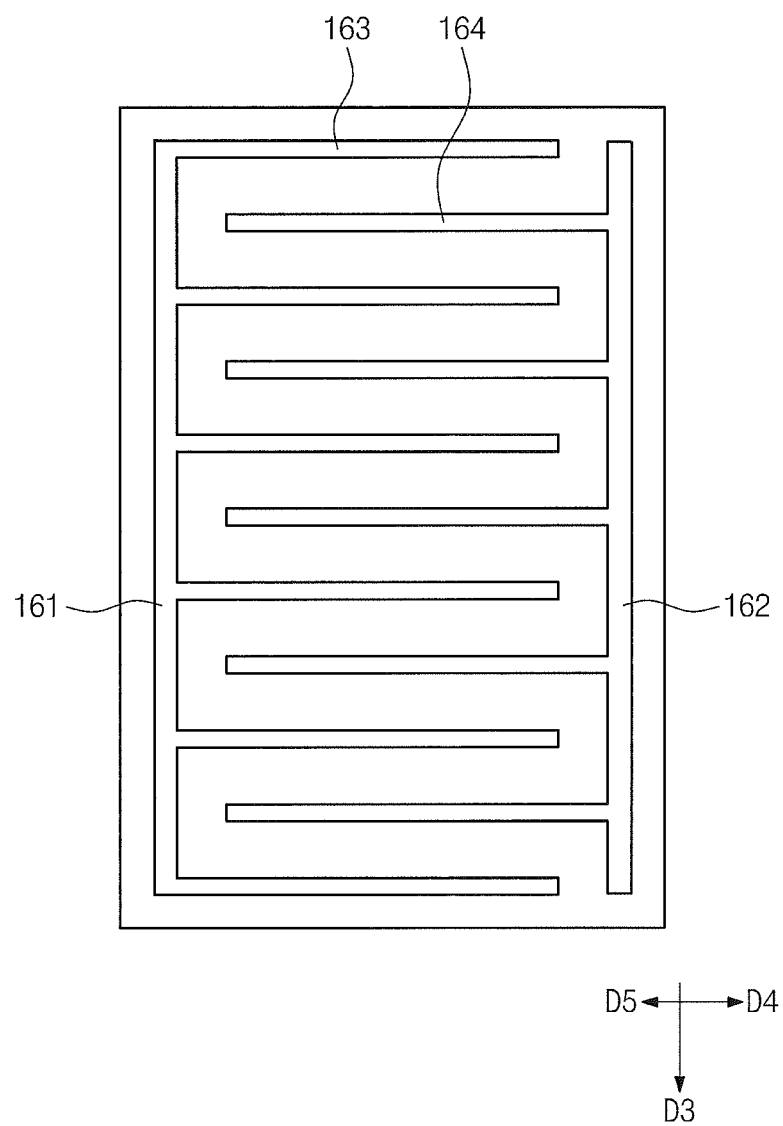

Referring to FIG. 8B, a first electrode 160 includes a first main electrode 161 and a second main electrode 162, which are substantially parallel to each other and each longitudinally extended in a third direction D3, a plurality of first sub-electrodes 163 branched from the first main electrode 161 and longitudinally extended in a fourth direction D4, and a plurality of second sub-electrodes 164 branched from the second main electrode 162 and longitudinally extended in a fifth direction D5. The first main electrode 161 and the first sub-electrodes 163 collectively form a single, unitary, indivisible electrode. Similarly, the second main electrode 162 and the second sub-electrodes 164 collective form a single, unitary, indivisible electrode.

The first sub-electrodes 163 are arranged in the third direction D3 at a regular interval, and the second sub-electrodes 164 are arranged in the third direction D3 at a regular interval. The first sub-electrodes 163 are alternately arranged with the second sub-electrodes 164 in the third direction D3.

In the illustrated exemplary embodiment, each of the first sub-electrodes 163 may be spaced apart from two second sub-electrodes 164 adjacent thereto at a regular interval.

Referring to FIG. 8C, the first sub-electrodes 163 have a width t1 that increases as the first sub-electrodes 163 are positioned closer to the center of the pixel area PA, and the second sub-electrodes 164 have a width t2 that increases as the second sub-electrodes 164 are positioned closer to the center of the pixel area PA. Accordingly, a distance between two first sub-electrodes 163 adjacent to each other decreases closer to the center of the pixel area PA, and a distance between two second sub-electrodes 164 adjacent to each other decreases closer to the center of the pixel area PA. The widths t1 and t2 are taken perpendicular to a longitudinal direction of the first sub-electrode 163 and the second sub-electrode 164, respectively.

When the distance between the first sub-electrodes 163 and between the second sub-electrodes 164 decreases closer to the center of the pixel area PA, the intensity of the electric field may be increased at the center of the pixel area PA. As described above, the intensity of the electric field may be controlled according to the positions in the pixel area PA by adjusting the distance between the first sub-electrodes 163 and the second sub-electrodes 164.

Figure 8D:
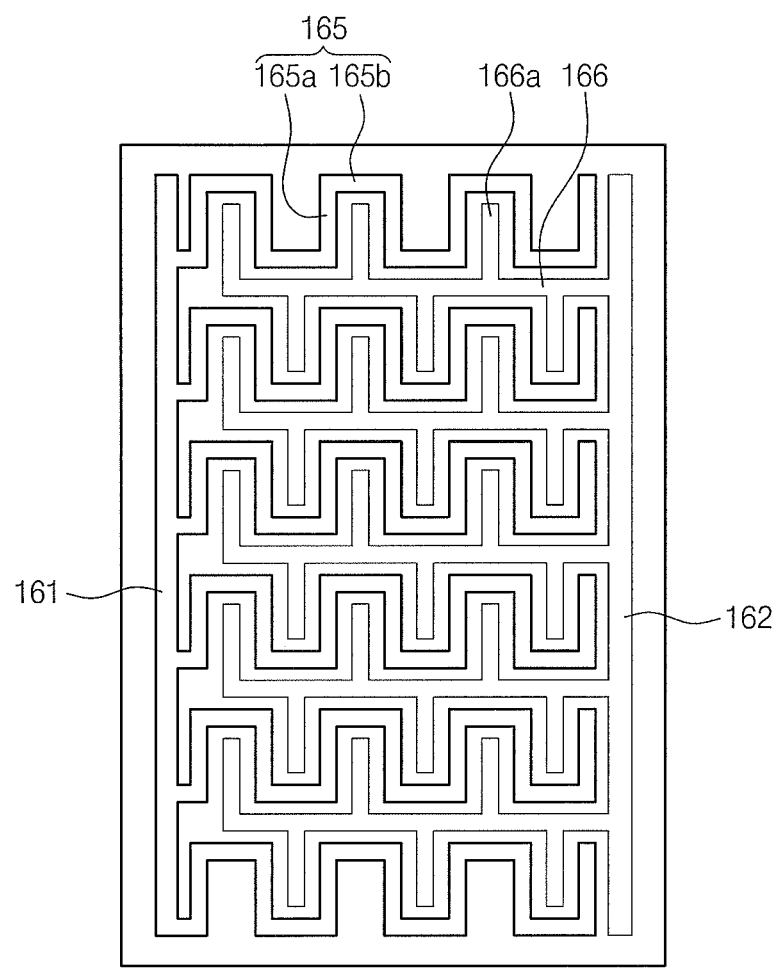

Referring to FIG. 8D, each of first sub-electrodes 165 may be bent at least one time. In detail, each of the first sub-electrodes 165 includes a plurality of first electrode portions 165a substantially parallel to the first main electrode 161, and a plurality of second electrode portions 165b, each connecting two adjacent first electrode portions 165a. The first electrode portions 165a alternate with the second electrode portions 165b in the fourth direction D4.

In addition, each of the second sub-electrodes 166 includes a plurality of branch electrodes 166a substantially parallel to the second main electrode 162, and each of the branch electrodes 166a is between two first electrode portions 165a adjacent to each other. The first electrode portions 165a alternate with the branch electrodes 166a in the fifth direction D5.

Thus, the electrophoretic particles 152 may be uniformly dispersed in the pixel area PA during the black driving mode, thereby improving the black driving characteristic of the display apparatus 100.

Figure 9:
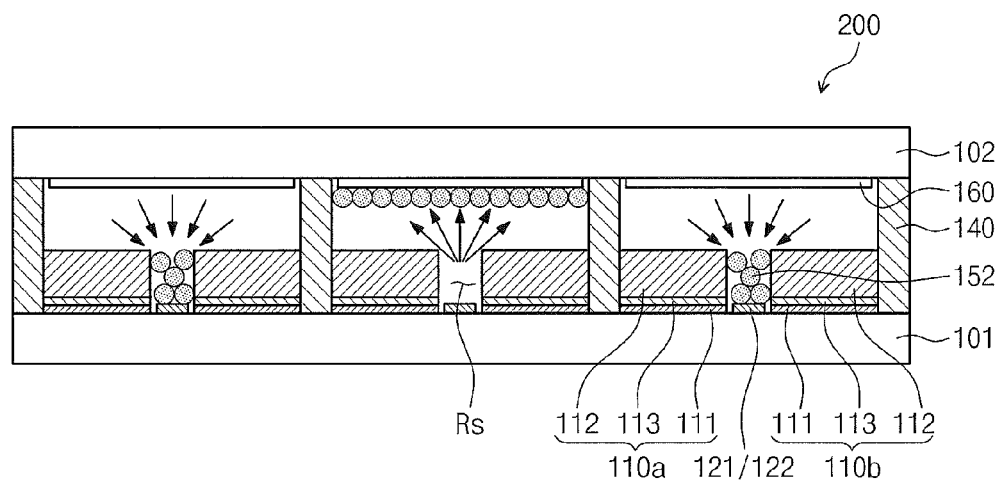
FIG. 9 is a cross-sectional view showing another exemplary embodiment of an electrophoretic display apparatus according to the invention.

FIG. 9 is a cross-sectional view showing another exemplary embodiment of an electrophoretic display apparatus according to the invention. In FIG. 9, the same reference numerals denote the same elements in FIG. 1, and thus detailed descriptions of the same elements will be omitted. The electrophoretic display apparatus 200 shown in FIG. 9 includes the second electrode 121 and 122 shown in FIG. 7B and the first electrode 160 shown in FIG. 8A.

Referring to FIG. 9, the electrophoretic display apparatus 200 includes first, second, third, and fourth sub-reflection parts 110a, 110b, 110c, and 110d arranged in each pixel area PA. However, only first and second sub-reflection parts 110a and 110b have been shown in FIG. 9. The receiving space Rs is provided between the first and second sub-reflection parts 110a and 110b, and the second electrode 121 and 122 corresponds to the receiving space Rs.

When a reference voltage of 0 volts is applied to the first electrode 160 and a driving voltage of about 15 volts is applied to the second electrode 121 and 122, the electrophoretic particles 152 having the positive (+) polarity move to the first electrode 160. Thus, the pixels may display the black gray scale.

When the reference voltage of 0 volts is applied to the first electrode 160 and the driving voltage of about −15 volts is applied to the second electrode 121 and 122, the electrophoretic particles 152 having the positive (+) polarity move to the second electrode 121 and 122. Thus, the pixels may display the white gray scale.

In the illustrated exemplary embodiment, the first electrode 160 may be a transparent electrode, and the second electrode 121 and 122 may be an opaque electrode. As another exemplary embodiment, the second electrode 121 and 122 may be a non-reflective electrode.

Figure 10:
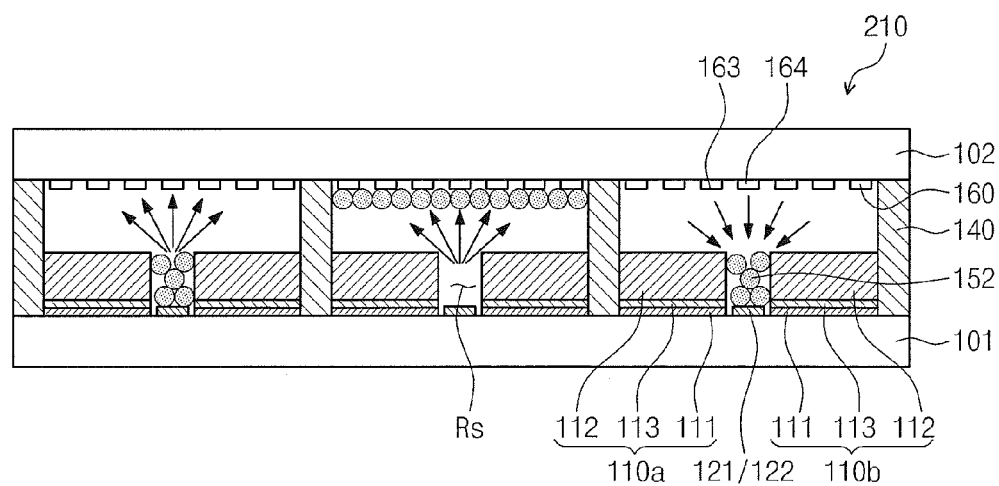
FIG. 10 is a cross-sectional view showing another exemplary embodiment of an electrophoretic display apparatus according to the invention.

FIG. 10 is a cross-sectional view showing another exemplary embodiment of an electrophoretic display apparatus according to the invention. The electrophoretic display apparatus 210 includes the second electrode 121 and 122 shown in FIG. 7B and the first electrode 163 and 164 shown in FIG. 8B.

Referring to FIG. 10, the electrophoretic display apparatus 210 includes first, second, third, and fourth sub-reflection parts 110a, 110b, 110c, and 110d arranged in each pixel area PA. However, only first and second sub-reflection parts 110a and 110b have been shown in FIG. 10. The receiving space Rs is provided between the first and second sub-reflection parts 110a and 110b, and the second electrode 121 and 122 corresponds to the receiving space Rs.

The first electrode 160 includes a plurality of first sub-electrodes 163 alternately arranged with a plurality of second sub-electrodes 164. The first and second sub-electrodes 163 and 164 receive the same voltage.

When a reference voltage of 0 volts is applied to the first and second sub-electrodes 163 and 164 and a driving voltage of about 15 volts is applied to the second electrode 121 and 122, the electrophoretic particles 152 having the positive (+) polarity move to the first and second sub-electrodes 163 and 164. Thus, the pixels may display the black gray scale. In this case, the first to fourth sub-reflection parts 110a, 110b, 110c, and 110d do not receive any voltage.

When the reference voltage of 0 volts is applied to the first and second sub-electrodes 163 and 164 and the driving voltage of about −15 volts is applied to the second electrode 121 and 122, the electrophoretic particles 152 having the positive (+) polarity move to the second electrode 121 and 122. Thus, the pixels may display the white gray scale.

In the illustrated exemplary embodiment, the first electrode 160 may be a transparent electrode, and the second electrode 121 and 122 may be an opaque electrode. As another exemplary embodiment, the second electrode 121 and 122 may be a non-reflective electrode.

Figure 11:
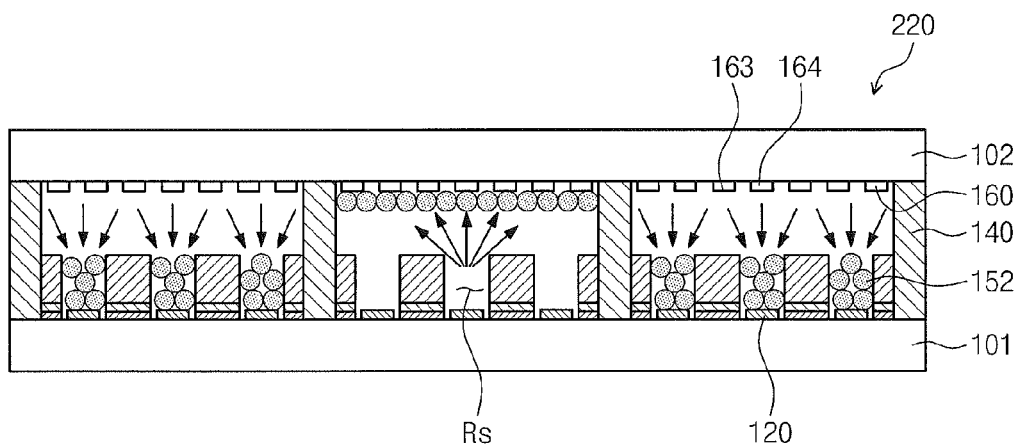
FIG. 11 is a cross-sectional view showing another exemplary embodiment of an electrophoretic display apparatus according to the invention.

FIG. 11 is a cross-sectional view showing another exemplary embodiment of an electrophoretic display apparatus according to the invention. The electrophoretic display apparatus 220 includes the second electrode shown in FIG. 7C and the first electrode 163 and 164 shown in FIG. 8B.

Referring to FIG. 11, the electrophoretic display apparatus 220 includes a plurality of sub-reflection parts in each pixel area PA. The receiving space Rs is provided between the sub-reflection parts, and the second electrode 120 corresponds to the receiving space Rs.

The first electrode 160 includes a plurality of first sub-electrodes 163 alternately arranged with a plurality of second sub-electrodes 164. The first and second sub-electrodes 163 and 164 receive the same voltage.

As shown in FIG. 7C, the second electrode 120 includes first, second, third, and fourth dividing electrodes 121a, 122a, 121b, and 122b. In addition, the first to fourth dividing electrodes 121a, 122a, 121b, and 122b are electrically connected to each other. Accordingly, the first to fourth dividing electrodes 121a, 122a, 121b, and 122b may receive the same voltage.

When a reference voltage of 0 volts is applied to the first and second sub-electrodes 163 and 164 and a driving voltage of about 15 volts is applied to the second electrode 120, the electrophoretic particles 152 having the positive (+) polarity move to the first and second sub-electrodes 163 and 164. Thus, the pixels may display the black gray scale. In this case, the sub-reflection parts do not receive any voltage.

When the reference voltage of 0 volts is applied to the first and second sub-electrodes 163 and 164 and the driving voltage of about −15 volts is applied to the second electrode 120, the electrophoretic particles 152 having the positive (+) polarity move to the second electrode 120. Thus, the pixels may display the white gray scale.

Figure 12:
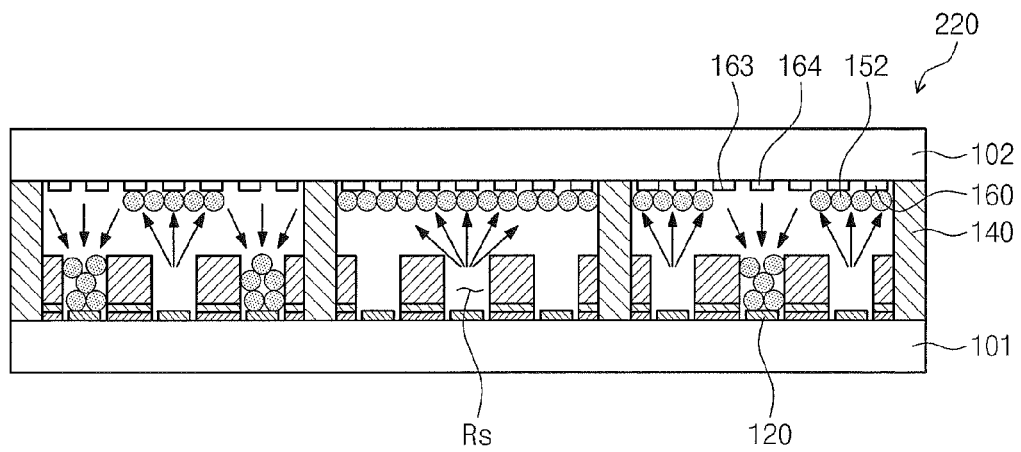
FIG. 12 is a cross-sectional view showing another exemplary embodiment of an electrophoretic display apparatus according to the invention.

FIG. 12 is a cross-sectional view showing another exemplary embodiment of an electrophoretic display apparatus according to the invention. The electrophoretic display apparatus 220 includes the second electrode shown in FIG. 7E and the first electrode 163 and 164 shown in FIG. 8B.

Referring to FIG. 12, the second electrode 120 includes first, third, fifth, and sixth dividing electrodes 121a, 121b, 121c, and 121d and second, fourth, and seventh dividing electrodes 122a, 122b, and 122c as shown in FIG. 7E. In addition, the first, third, fifth, and sixth dividing electrodes 121a, 121b, 121c, and 121d may be electrically insulated from the second, fourth, and seventh dividing electrodes 122a, 122b, and 122c. When the first, third, fifth, and sixth dividing electrodes 121a, 121b, 121c, and 121d are electrically insulated from the second, fourth, and seventh dividing electrodes 122a, 122b, and 122c, the first, third, fifth, and sixth dividing electrodes 121a, 121b, 121c, and 121d may receive a voltage having a different level from a voltage applied to the second, fourth, and seventh dividing electrodes 122a, 122b, and 122c.

As shown in FIG. 12, when a driving voltage of about −15 volts is applied to the first, third, fifth, and sixth dividing electrodes 121a, 121b, 121c, and 121d and a driving voltage of about +15 volts is applied to the second, fourth, and seventh dividing electrodes 122a, 122b, and 122c, a part of the electrophoretic particles 152 move to the second electrode 120 and a part of the electrophoretic particles 152 move to the first electrode 160 within a same pixel area. Thus, the pixels may display an intermediate gray scale when the second electrode 120 is divided into two groups that are electrically insulated from each other and receive different voltages.

In the illustrated exemplary embodiment, the first electrode 160 may be a transparent electrode and the second electrode 120 may be a transparent electrode or an opaque electrode. As another exemplary embodiment, the second electrode 120 may be a non-reflective electrode.

Figure 13:
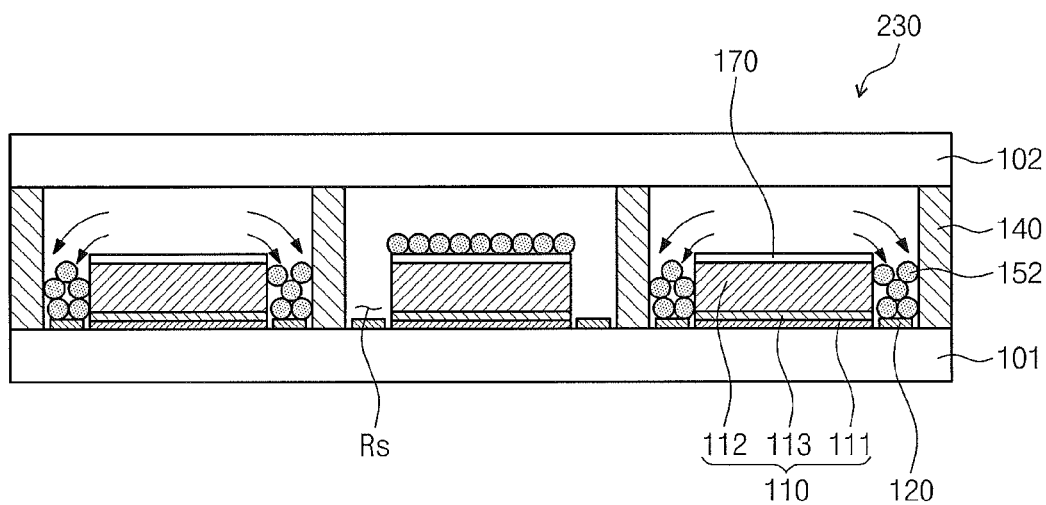
FIG. 13 is a cross-sectional view showing another exemplary embodiment of an electrophoretic display apparatus according to the invention.

FIG. 13 is a cross-sectional view showing another exemplary embodiment of an electrophoretic display apparatus according to the invention.

Referring to FIG. 13, an electrophoretic display apparatus 230 has a substantially similar structure as the display apparatus 100 shown in FIG. 1 except that a first electrode 170 is on the reflection part 110.

In detail, the first electrode 170 may be directly on the color-expression layer 112 that is an uppermost layer in the reflection part 110.

Figure 14:
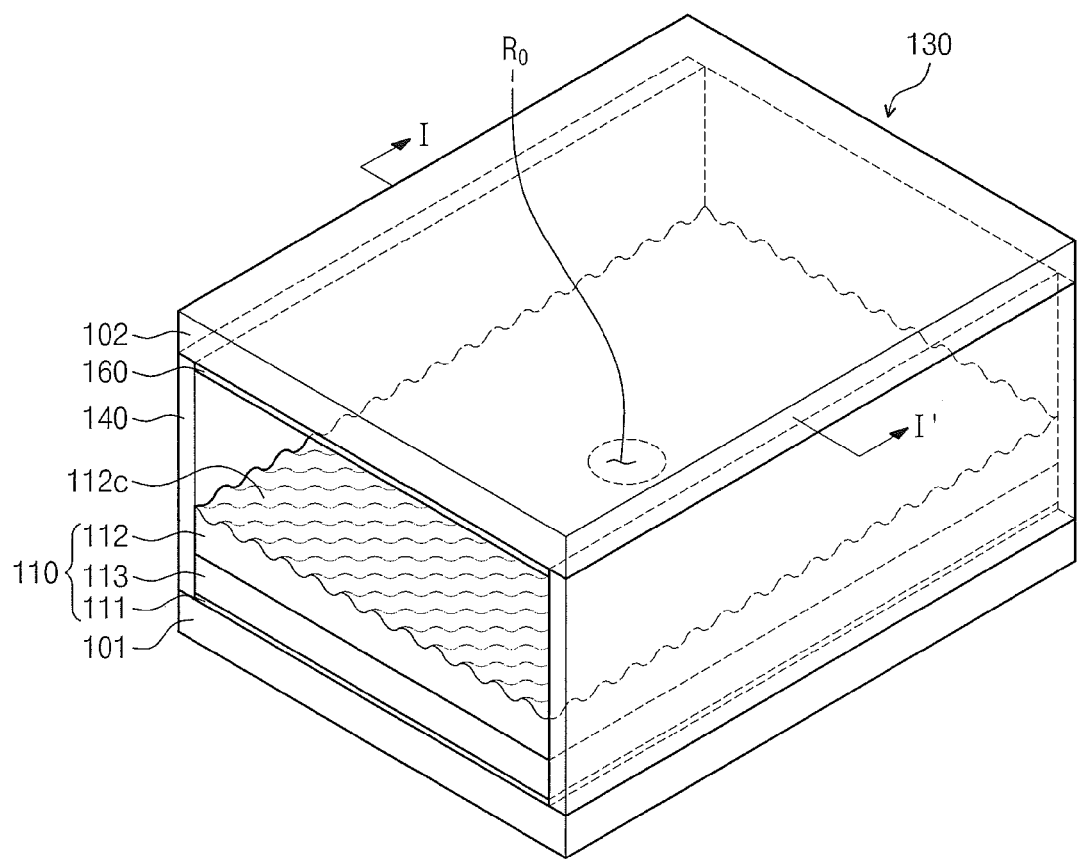
FIG. 14 is a perspective view showing another exemplary embodiment of an electrophoretic display apparatus according to the invention.
Figure 15:
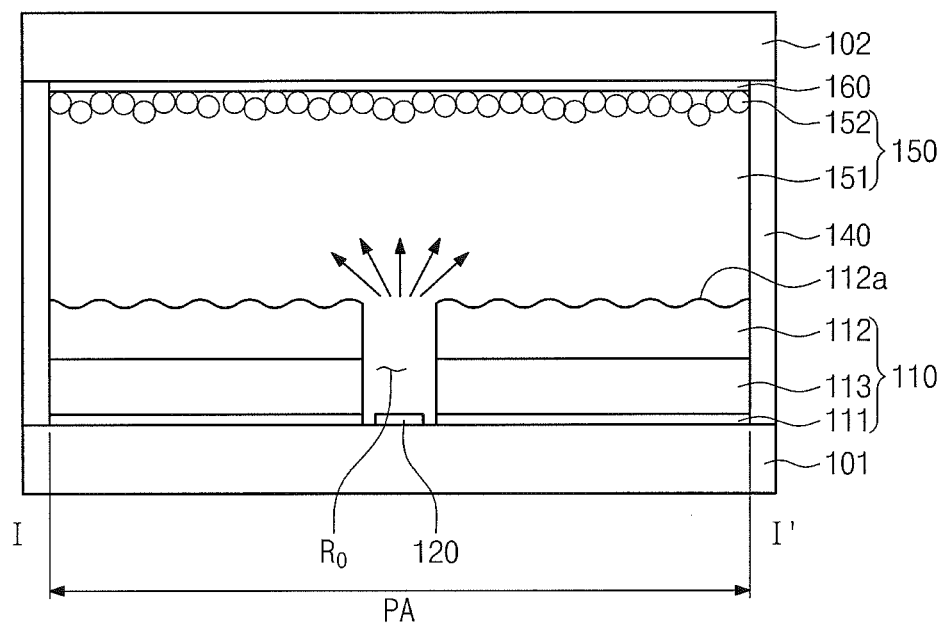
FIG. 15 is a cross-sectional view taken along line I-I' of FIG. 14.

FIG. 14 is a perspective view showing another exemplary embodiment of an electrophoretic display apparatus according to the invention, and FIG. 15 is a cross-sectional view taken along line I-I' of FIG. 14.

Referring to FIGS. 14 and 15, each pixel 130 of an electrophoretic display apparatus includes the first substrate 101, the second substrate 102 facing the first substrate, and the electrophoretic material 150 between the first substrate 101 and the second substrate 102, and the first electrode 160 on the second substrate 102. Each pixel 130 is between the first substrate 101 and the second substrate 102 and further includes the barrier wall 140 positioned between the pixels.

The electrophoretic material 150 includes the dielectric solvent 151 and the plurality of electrophoretic particles 152 dispersed in the dielectric solvent 151. The electrophoretic particles 152 may be particles colored by a white, black, red, green, or blue color. The electrophoretic particles 152 move along a direction of an electric field generated between the first substrate 101 and the second substrate 102.

Each pixel 130 includes the reflection part 110 and the second electrode 120. In detail, the reflection part 110 is on the first substrate 101 and has a triple-layer structure.

The reflection part 110 includes the reflection layer 111 to reflect light, the color-expression layer 112 to scatter or transmit the reflected light, and the intermediate layer 113 between the color-expression layer 112 and the reflection layer 111.

In one exemplary embodiment, the reflection layer 111 may include a material having high reflectance such as aluminum (Al) and has a thickness of about 0.1 micrometer.

The color-expression layer 112 may include a white photoresist. In the illustrated exemplary embodiment, the white photoresist may include titanium oxide ($TiO_2$) having a refractive index of about 2.89. In addition, the color-expression layer 112 may include an embossing structure 112c on an upper surface thereof. When the color-expression layer 112 has the embossing structure 112c on the upper surface thereof, the surface area of the color-expression layer 112 may be increased, thereby improving brightness during the white driving mode.

The intermediate layer 113 includes a material having a lower refractive index than that of the color-expression layer 112. In the illustrated exemplary embodiment, the intermediate layer 113 may include at least one layer of a transparent inorganic layer, a transparent organic layer, or a transparent conductive layer. The transparent inorganic layer may include a silicon nitride layer (SiNx) or a silicon oxide layer (SiOx). The transparent organic layer may include an acrylic-based resin. The transparent conductive layer may include indium tin oxide or indium zinc oxide.

In an exemplary embodiment, the reflection part 110 is provided with a receiving space $R_O$ in which the electrophoretic particles 152 are accommodated. The receiving space $R_O$ may be a hole extending through a thickness of the reflection part 110 to expose a portion of the first substrate 101. When the portion of the first substrate 101 is exposed through the receiving space $R_O$, the second electrode 120 is on the exposed portion of the first substrate 101. The receiving space $R_O$ is void of any material of the reflection part 110 and may be considered an enclosed opening, such that the reflection part 110 solely defines the receiving space $R_O$.

The second electrode 120 may include the same material, for example aluminum (Al), as the reflection part 110. As another exemplary embodiment, the second electrode 120 may have a single-layer structure of aluminum (Al) or a double-layer structure of aluminum (Al) and indium tin oxide.

In the illustrated exemplary embodiment, the electrophoretic particles 152 may include black particles such as a carbon black particle.

When a first voltage is applied to the first electrode 160 and a second voltage higher than the first voltage is applied to the second electrode 120 while the electrophoretic particles 152 have a positive (+) polarity, the electrophoretic particles 152 move to the first electrode 160. In addition, when the first voltage is applied to the first electrode 160 and a third voltage lower than the first voltage is applied to the second electrode 120 while the electrophoretic particles 152 have the positive (+) polarity, the electrophoretic particles 152 move to the second electrode 120 and are accommodated in the receiving space $R_0$.

When the electrophoretic particles 152 have a negative (−) polarity, the electrophoretic particles 152 move to opposite directions to the above-mentioned directions when the electrophoretic particles 152 have the positive (+) polarity.

Figure 16A:
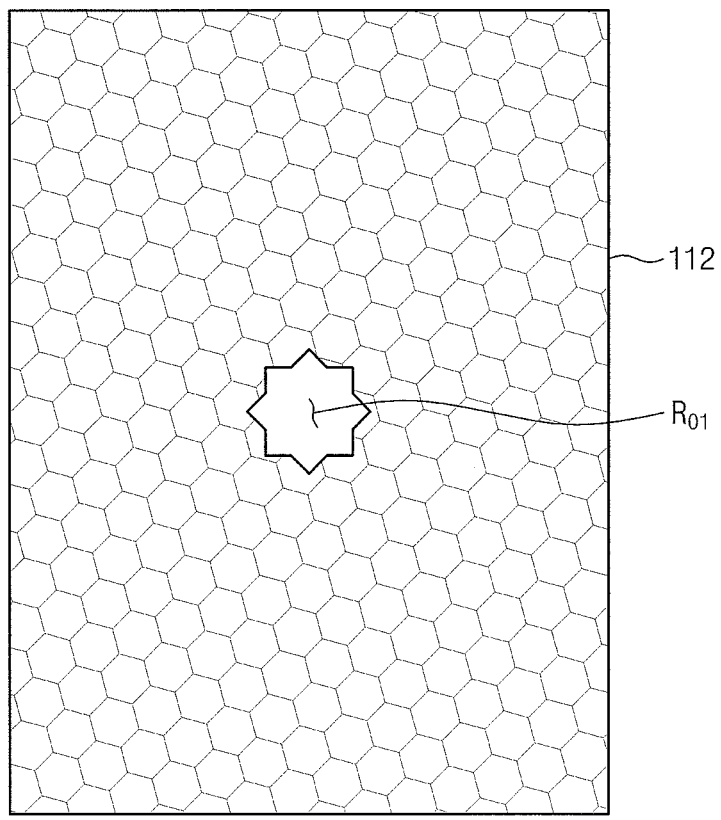
FIGS. 16A to 16C are plan views showing exemplary embodiments of a shape of a receiving space of the reflection part.
Figure 16B:
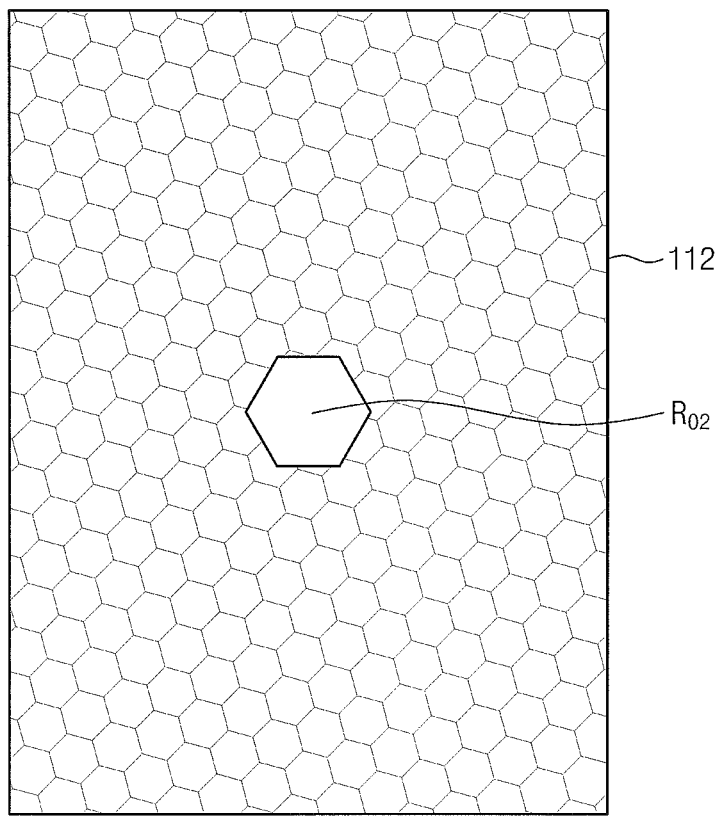
Figure 16C:
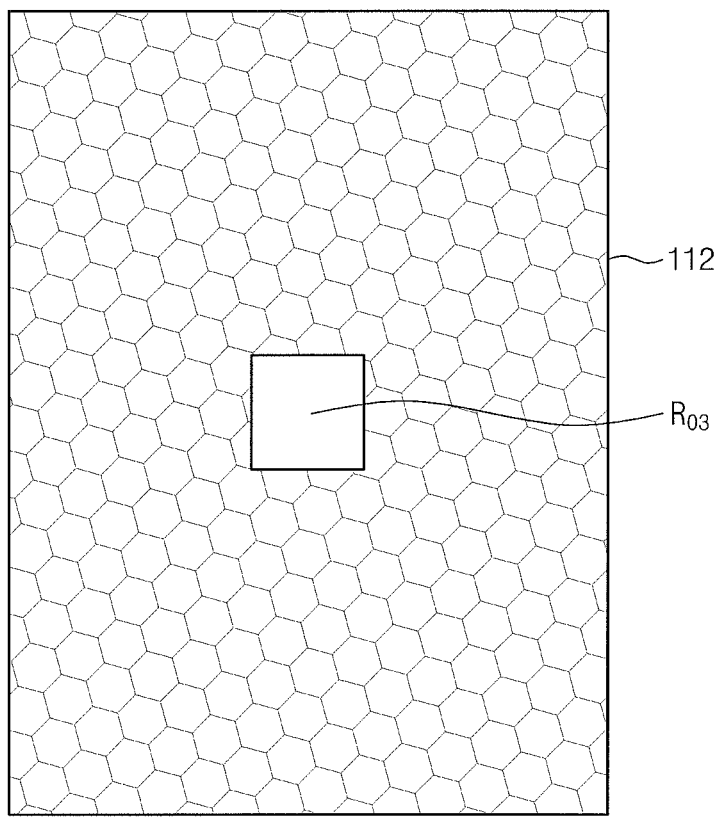

FIGS. 16A to 16C are plan views showing exemplary embodiments of a planar shape of a receiving space extended through the thickness the reflection part 110.

Referring to FIGS. 16A to 16C, the reflection part 110 may be provided with receiving spaces $R_{01}$, $R_{02}$, and $R_{03}$ respectively having a star shape, a hexagon shape, and a quadrangular shape, but the shape of the receiving spaces $R_{01}$, $R_{02}$, and $R_{03}$ should not be limited thereto or thereby.

Figure 17:
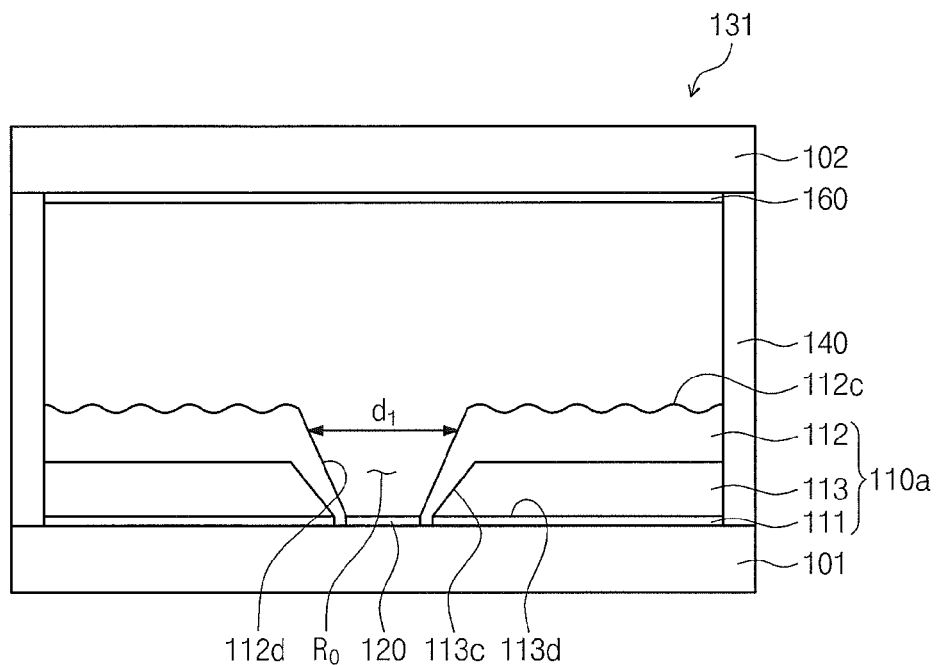
FIG. 17 is a cross-sectional view showing another exemplary embodiment of a pixel according to the invention.

FIG. 17 is a cross-sectional view showing another exemplary embodiment of a pixel according to the invention.

Referring to FIG. 17, a pixel 131 includes the reflection part 110a provided with the receiving space $R_0$, and the second electrode 120 in the receiving space $R_0$.

The reflection part 110a includes the reflection layer 111, the intermediate layer 113 on the reflection layer 111, and the color-expression layer 112 on the intermediate layer 113. The reflection layer 111 and the intermediate layer 113 are partially absent corresponding to an area of the receiving space $R_0$. The intermediate layer 113 includes a cutting surface 113c that is inclined and adjacent to the receiving space $R_0$. In detail, an angle between the cutting surface 113c and a bottom surface 113d of the intermediate layer 113 is an acute angle.

The color-expression layer 112 covers an upper surface and the cutting surface 113c of the intermediate layer 113. In addition, the color-expression layer 112 is absent from the area of the receiving space $R_0$ to expose a portion of the first substrate 101. The second electrode 120 is on the exposed portion of first substrate 101.

The color-expression layer 112 may include a cutting surface 112d that is inclined and adjacent to the receiving space $R_0$. Thus, a diameter d1 of the receiving space $R_0$ may be gradually increased taken in a direction away from the exposed surface of the first substrate 101. In addition, the cutting surface 112d of the color-expression layer 112 may make contact with the end of the second electrode 120.

As shown in FIG. 17, since the side surface of the reflection part 110, which defines the receiving spacer $R_0$, is inclined, the electric field may be uniformly distributed between the first and second substrate 101 and 102. In addition, an entire volume of the receiving space $R_0$ increases, the number of the electrophoretic particles 152 accommodated in the receiving space $R_0$ may be increased.

Figure 18:
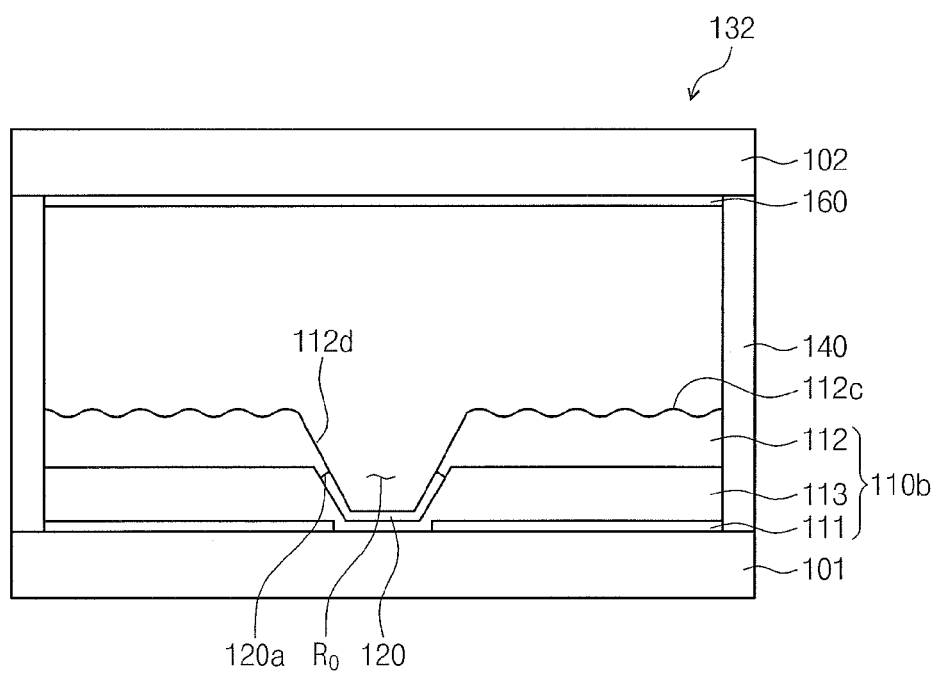
FIG. 18 is a cross-sectional view showing another exemplary embodiment of a pixel according to the invention.

FIG. 18 is a cross-sectional view showing another exemplary embodiment of a pixel according to the invention.

Referring to FIG. 18, a pixel 132 includes the reflection part 110b provided with the receiving space $R_0$ and the second electrode 120 in the receiving space $R_0$.

The reflection part 110b includes the reflection layer 111, the intermediate layer 113 on the reflection layer 111, and the color-expression layer 112 on the intermediate layer 113. The reflection layer 111 is partially absent corresponding to an area of the receiving space $R_0$, thereby exposing a portion of the first substrate 101.

The intermediate layer 113 is on an upper surface of the reflection layer 111 and on the exposed portion of the first substrate 101 through the receiving space $R_0$. The intermediate layer 113 may be partially recessed in the area from which the reflection layer 111 is partially absent to define the receiving space $R_0$. The side surface of the intermediate layer 113, which defines the receiving space $R_0$, may be tapered.

The second electrode 120 is on the intermediate layer 113 corresponding to the receiving space $R_0$. In an exemplary embodiment, a portion of the second electrode 120 may cover the side surface of the intermediate layer 113, which defines the receiving space $R_0$. In addition, the second electrode 120 is has a uniform thickness, so the receiving space $R_0$ is not filled with the second electrode 120.

The color-expression layer 112 is on the intermediate layer 113 and is partially absent to expose the second electrode 120. The cutting surface 112d of the color-expression layer 112, which is adjacent to the receiving space $R_0$, may be inclined. In addition, the cutting surface 112d of the color-expression layer 113 may make contact with an end surface 120a of the second electrode 120.

The color-expression layer 112 may include an embossing structure 112c on the upper surface thereof.

As shown in FIG. 18, since the second electrode 120 covers the side surface of the intermediate layer 113, which defines the receiving spacer $R_0$, the electric field may be uniformly distributed between the first and second substrate 101 and 102.

Figure 19:
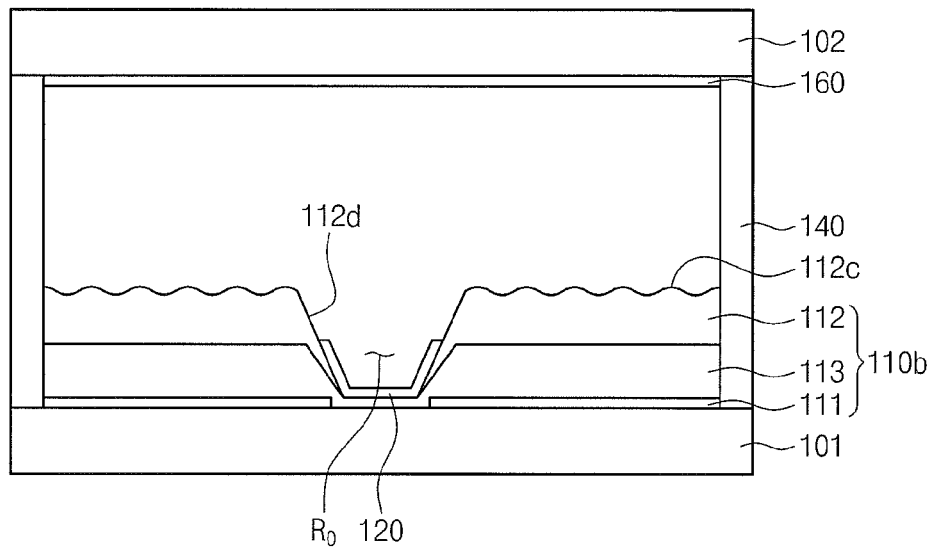
FIG. 19 is a cross-sectional view showing another exemplary embodiment of a pixel according to the invention.

FIG. 19 is a cross-sectional view showing another exemplary embodiment of a pixel according to the invention. In FIG. 19, the same reference numerals denote the same elements in FIG. 18, and thus detailed descriptions of the same elements will be omitted.

Referring to FIG. 19, the color-expression layer 112 is on the intermediate layer 113. In detail, the color-expression layer 112 covers the entire side surface of the intermediate layer 113, which defines the receiving space $R_0$ and is tapered.

The second electrode 120 is on the intermediate layer 113 corresponding to the receiving space $R_0$. In an exemplary embodiment, both ends of the second electrode 120 may be extended to partially cover the cutting surface 112d of the color-expression layer 112.

Figure 20:
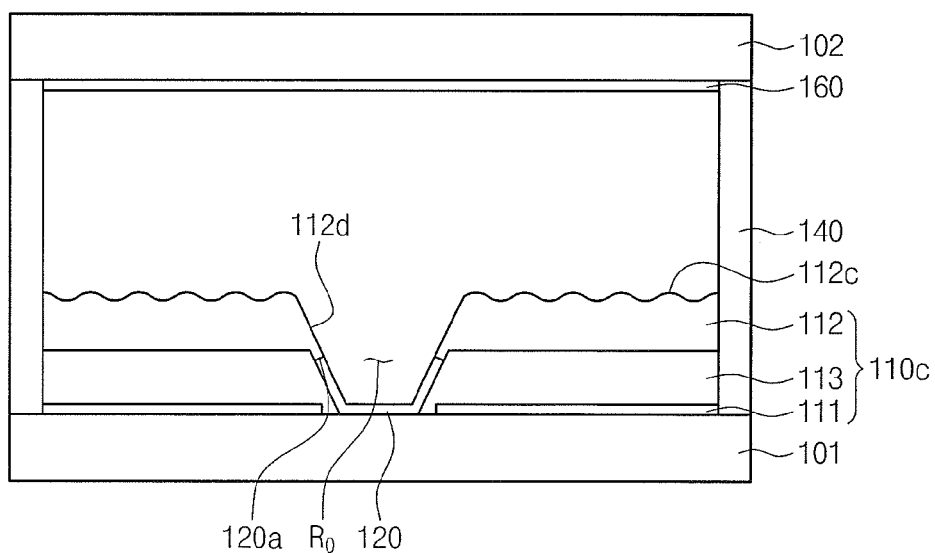
FIG. 20 is a cross-sectional view showing another exemplary embodiment of a pixel according to the invention.

FIG. 20 is a cross-sectional view showing another exemplary embodiment of a pixel according to the invention.

Referring to FIG. 20, the reflection layer 111 and the intermediate layer 113 are partially absent in the area corresponding to the receiving space $R_0$ to expose a portion of the upper surface of the first substrate 101. The intermediate layer 113 covers the cutting surface of the reflection layer 111 and the cutting surface 113c thereof is inclined to define the receiving space $R_0$.

The second electrode 120 is on the exposed upper surface of the first substrate 101 and on the cutting surface 113c of the intermediate layer 113. The second electrode 120 has a uniform thickness, and thus the receiving space $R_0$ is not filled with the second electrode 120.

The color-expression layer 112 covers the upper surface and the cutting surface 113c of the intermediate layer 113. In addition, the color-expression layer 112 is absent in the area corresponding to the receiving space R$_O$ to expose the second electrode 120. The cutting surface 112d of the color-expression layer 112, which is adjacent to the receiving space R$_O$, may be inclined. Further, the cutting surface 112d of the color-expression layer 112 may make contact with the end surface 120a of the second electrode 120.

The color-expression layer 112 may include an embossing structure 120c on the upper surface thereof.

As shown in FIG. 20, when the second electrode 120 covers the cutting surface 113c of the intermediate layer 113, which defines the receiving spacer R$_O$, the electric field may be uniformly distributed between the first and second substrate 101 and 102.

Figure 21:
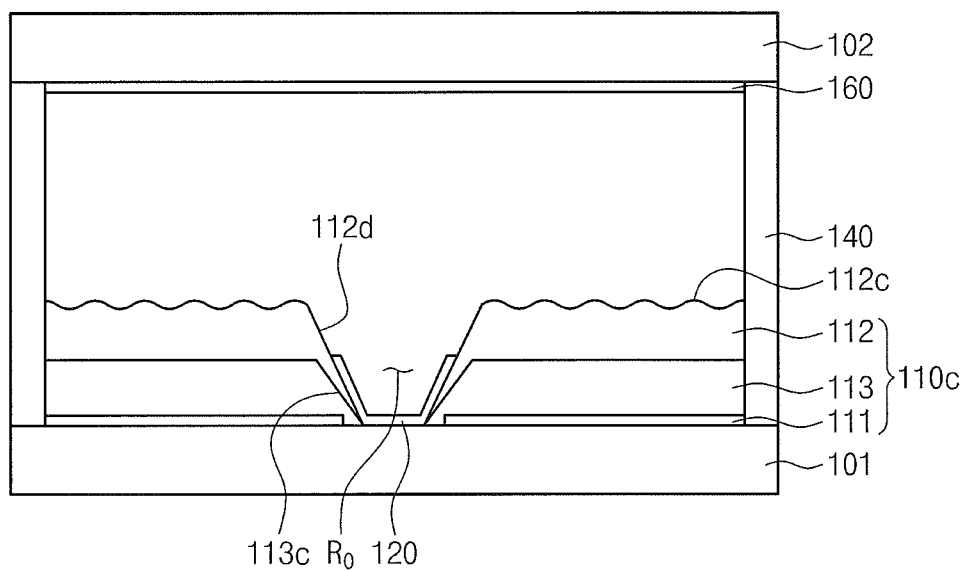
FIG. 21 is a cross-sectional view showing another exemplary embodiment of a pixel according to the invention.

FIG. 21 is a cross-sectional view showing another exemplary embodiment of a pixel according to the invention. In FIG. 21, the same elements denote the same elements in FIG. 20, and thus detailed descriptions of the same elements will be omitted.

Referring to FIG. 21, the color-expression layer 112 is on the intermediate layer 113. In detail, the color-expression layer 112 covers the entire side surface of the intermediate layer 113, which defines the receiving space R$_O$ and is tapered.

The second electrode 120 is on the intermediate layer 113 corresponding to the receiving space R$_O$. In an exemplary embodiment, both ends of the second electrode 120 may be extended to partially cover the cutting surface 112d of the color-expression layer 112.

Figure 22A:
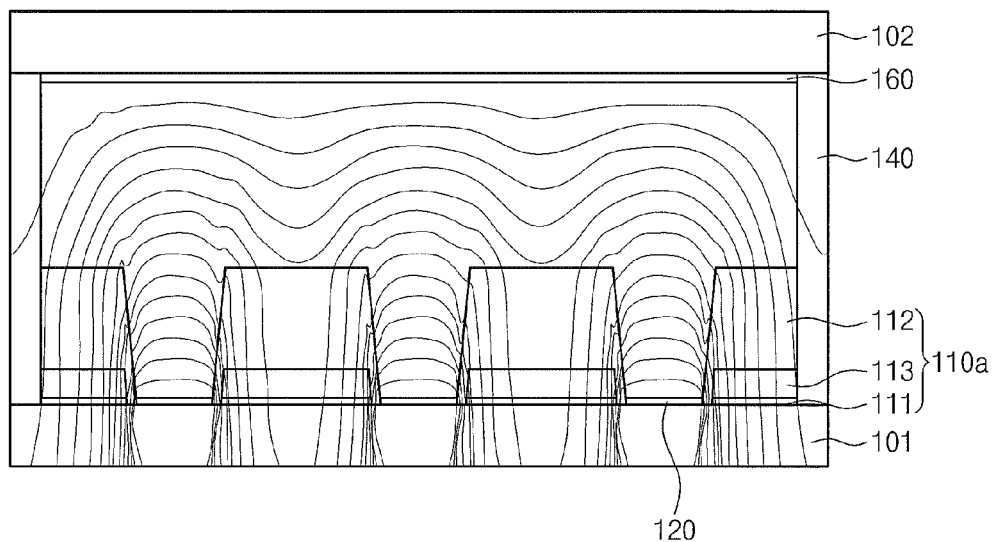
FIGS. 22A and 22B are views showing a horizontal electric field distribution between a first substrate and a second substrate according to a shape of a second electrode.
Figure 22B:
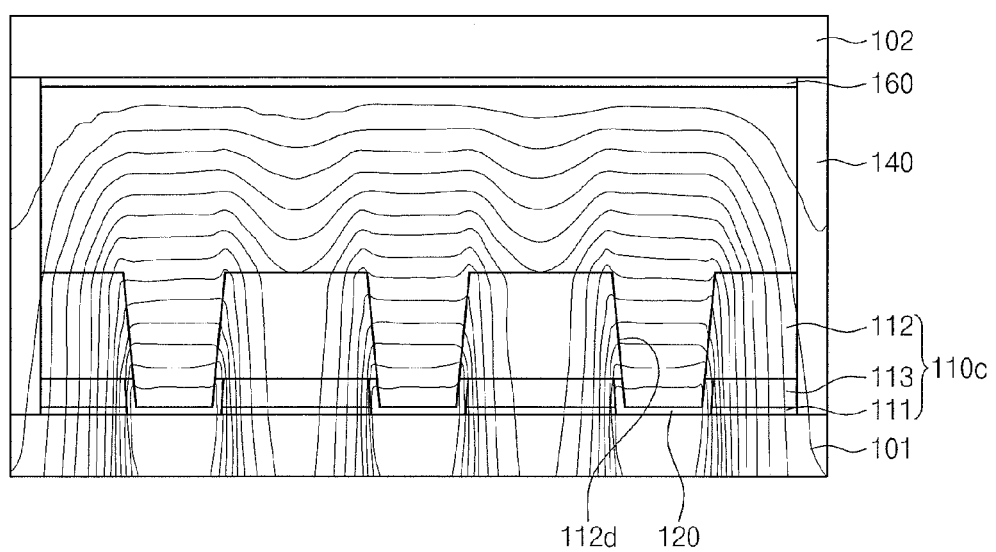

FIGS. 22A and 22B are views showing a horizontal electric field distribution between a first substrate and a second substrate according to a shape of a second electrode. FIG. 22A shows the horizontal electric field distribution of the pixel shown in FIG. 17, and FIG. 22B shows the horizontal electric field distribution of the pixel shown in FIG. 20.

Referring to FIGS. 22A and 22B, the horizontal electric field distribution between the first and second substrates 101 and 102 was uniformly represented when the both ends of the second electrode 120 were extended to cover the portion of the cutting surface 113c of the intermediate layer 113 than when the both ends of the second electrode 120 were positioned on the upper surface of the first substrate 101. Thus, the electrophoretic particles may be uniformly distributed at the first electrode 160 during the black driving mode, thereby preventing the light leakage during the black driving mode.

Figure 23A:
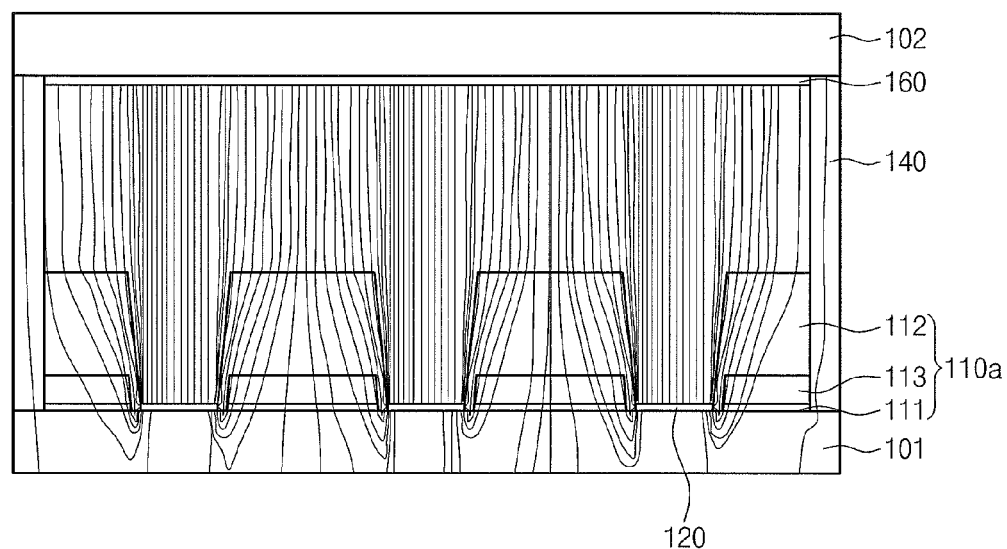
FIGS. 23A and 23B are views showing a vertical electric field distribution between a first substrate and a second substrate according to a shape of a second electrode.
Figure 23B:
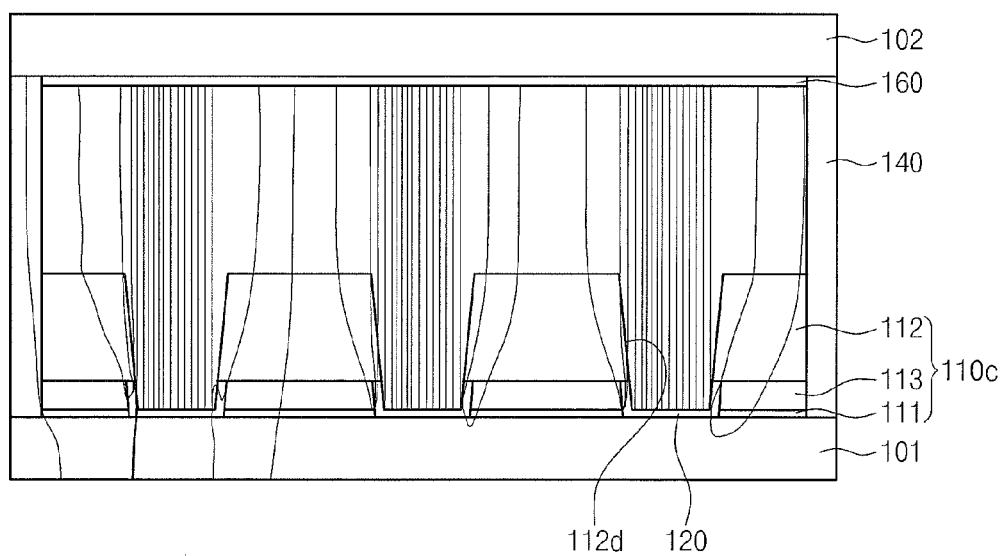

FIGS. 23A and 23B are views showing a vertical electric field distribution between a first substrate and a second substrate according to a shape of a second electrode. FIG. 23A shows the vertical electric field distribution of the pixel shown in FIG. 17, and FIG. 23B shows the vertical electric field distribution of the pixel shown in FIG. 20.

Referring to FIGS. 23A and 23B, the vertical electric field above the color-expression layer 112 was stronger when the both ends of the second electrode 120 are positioned only on the upper surface of the first substrate 101 than when the both ends of the second electrode 120 were extended to the portion of the cutting surface 113c of the intermediate layer 113.

When the vertical electric field is strongly formed above the color-expression layer 112, the amount of the electrophoretic particles 152 remaining on the color-expression layer 112 may be increased without being accommodated in the receiving space R$_O$. Accordingly, the brightness may be lowered during the white driving mode.

Thus, the both ends of the second electrode 120 may be extended to partially cover the cutting surface 113c of the intermediate layer 113 in order to improve the display characteristic and the bright characteristic during the black and white driving modes.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. An electrophoretic display apparatus comprising:
   a first substrate comprising a plurality of pixels;
   a second substrate facing the first substrate;
   an electrophoretic material between the first substrate and the second substrate; and
   a first electrode on the first substrate or the second substrate, each pixel comprising:
      a reflection part on the first substrate, wherein the reflection part reflects a light incident through the second substrate; and
      a second electrode on the first substrate and adjacent to the reflection part,
   wherein
      the second electrode forms an electric field with the first electrode such that the electrophoretic material moves to the first electrode or the second electrode, and
      an upper surface of the second electrode is positioned at a first height from the first substrate, and an upper surface of an uppermost layer of the reflection part is positioned at a second height higher than the first height.

2. The electrophoretic display apparatus of claim 1, wherein the reflection part comprises at least two layers having different refractive indexes from each other, and overlapping each other.

3. The electrophoretic display apparatus of claim 2, wherein the reflection part comprises:
   a reflection layer on the first substrate, the reflection layer reflecting the light; and
   a color-expression layer on the reflection layer, the reflection layer between the color expression layer and the first substrate.

4. The electrophoretic display apparatus of claim 3, wherein the reflection part further comprises an intermediate layer between the reflection layer and the color-expression layer, and having a lower refractive index than the color-expression layer.

5. The electrophoretic display apparatus of claim 4, wherein the intermediate layer comprises at least one of a transparent organic layer, a transparent conductive layer, and a transparent inorganic insulating layer.

6. The electrophoretic display apparatus of claim 5, wherein
   the reflection layer has a thickness of about 0.1 micrometer,
   the color-expression layer has a thickness of about 3 micrometers, and
   an intermediate layer has a thickness of about 0.2 micrometer to about 2 micrometers.

7. The electrophoretic display apparatus of claim 3, wherein
   the electrophoretic material comprises a dielectric solvent, and a plurality of electrophoretic particles dispersed in the dielectric solvent, and
   the electrophoretic particles have at least one color of a white, black, red, green, and blue color.

8. The electrophoretic display apparatus of claim 7, wherein the color-expression layer has the white color, and the electrophoretic particles have the black color.

9. The electrophoretic display apparatus of claim 7, wherein the color-expression layer has at least one color of the black color, the red color, the green color, and the blue color, and the electrophoretic particles have the white color.

10. The electrophoretic display apparatus of claim 3, wherein
the reflection part further comprises a receiving space defined by a side surface of the reflection part, and in which the electrophoretic material is accommodated, and
the second electrode is in the receiving space.

11. The electrophoretic display apparatus of claim 10, wherein the side surface of the reflection part is tapered.

12. The electrophoretic display apparatus of claim 11, wherein opposing ends of the second electrode partially cover the side surface of the reflection part.

13. The electrophoretic display apparatus of claim 3, wherein the second electrode is partially overlapped with the color-expression layer.

14. The electrophoretic display apparatus of claim 1, further comprising a barrier wall between the first substrate and the second substrate, wherein the barrier wall divides the display apparatus into pixel areas respectively including the pixels.

15. The electrophoretic display apparatus of claim 14, wherein
the second electrode is between the barrier wall and the reflection part, and
the electrophoretic material moved to the second electrode is accommodated in a receiving space between the barrier wall and the reflection part.

16. The electrophoretic display apparatus of claim 15, wherein
the electrophoretic material comprises a dielectric solvent, and a plurality of electrophoretic particles dispersed in the dielectric solvent, and
the barrier wall is spaced apart from the reflection part by a width which is larger than a diameter of each electrophoretic particle.

17. The electrophoretic display apparatus of claim 15, wherein the first substrate further comprises a recess extending from an upper surface of the first substrate, and overlapping the receiving space between the barrier wall and the reflection part.

18. The electrophoretic display apparatus of claim 14, wherein
the reflection part is divided into a plurality of sub-reflection parts spaced apart from each other,
the second electrode is between adjacent sub-reflection parts, and
the electrophoretic material moving to the second electrode is accommodated in a receiving space between the adjacent sub-reflection parts.

19. The electrophoretic display apparatus of claim 18, wherein
the second electrode comprises at least one first dividing electrode longitudinally extending in a first direction, and at least one second dividing electrode longitudinally extending in a second direction substantially perpendicular to the first direction.

20. The electrophoretic display apparatus of claim 19, wherein the first dividing electrode crosses the second dividing electrode at a center of each pixel.

21. The electrophoretic display apparatus of claim 19, wherein
each of the first and second dividing electrodes is provided in plural numbers,
the first dividing electrodes are arranged in the second direction at a regular interval, and
the second dividing electrodes are arranged in the first direction at a regular interval.

22. The electrophoretic display apparatus of claim 21, wherein
a distance between adjacent first dividing electrodes is approximately two times a distance between an outermost first dividing electrode positioned at an outermost position among the first dividing electrodes and a first end of the barrier wall adjacent to and parallel to the first outermost dividing electrode, and
a distance between adjacent second dividing electrodes is approximately two times a distance between an outermost second dividing electrode positioned at an outermost position among the second dividing electrodes and a second end of the barrier wall adjacent to and parallel to the second outermost dividing electrode.

23. The electrophoretic display apparatus of claim 19, wherein the first dividing electrode is electrically insulated from the second dividing electrode.

24. The electrophoretic display apparatus of claim 14, wherein the first electrode is on a lower surface of the second substrate and faces the first substrate.

25. The electrophoretic display apparatus of claim 24, wherein the first electrode comprises:
a first main electrode longitudinally extended in the first direction;
a second main electrode longitudinally extended in the first direction and parallel to the first main electrode;
a plurality of first sub-electrodes branched from the first main electrode and longitudinally extended in the second direction; and
a plurality of second sub-electrodes branched from the second main electrode and longitudinally extended in a third direction opposite to the second direction.

26. The electrophoretic display apparatus of claim 25, wherein the first sub-electrodes are alternately arranged with the second sub-electrodes.

27. The electrophoretic display apparatus of claim 26, wherein
a width of each of the first sub-electrodes increases as the first sub-electrodes are positioned closer to a center of the pixel area, and
a width of each of the second sub-electrodes increases as the second sub-electrodes are positioned closer to the center of the pixel area.

28. The electrophoretic display apparatus of claim 26, wherein
each of the first sub-electrodes is bent at least one time and comprises a plurality of electrode portions substantially parallel to the first main electrode, and
each of the second sub-electrodes comprises a plurality of branch electrodes substantially parallel to the second main electrode, and each of the branch electrodes is between adjacent electrode portions.

29. The electrophoretic display apparatus of claim 1, wherein the first electrode is directly on the reflection part.

* * * * *